United States Patent
Puranic et al.

(10) Patent No.: US 12,208,521 B1
(45) Date of Patent: Jan. 28, 2025

(54) SYSTEM AND METHOD FOR ROBOT LEARNING FROM HUMAN DEMONSTRATIONS WITH FORMAL LOGIC

(71) Applicant: University of Southern California, Los Angeles, CA (US)

(72) Inventors: Aniruddh Gopinath Puranic, Los Angeles, CA (US); Jyotirmoy Deshmukh, Los Angeles, CA (US); Stefanos Nikolaidis, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 363 days.

(21) Appl. No.: 17/580,552

(22) Filed: Jan. 20, 2022

Related U.S. Application Data

(60) Provisional application No. 63/139,540, filed on Jan. 20, 2021.

(51) Int. Cl.
*B25J 9/16* (2006.01)
*B25J 9/00* (2006.01)

(52) U.S. Cl.
CPC ............. *B25J 9/163* (2013.01); *B25J 9/0081* (2013.01); *B25J 9/161* (2013.01); *B25J 9/1658* (2013.01)

(58) Field of Classification Search
CPC . B25J 9/163; B25J 9/0081; B25J 9/161; B25J 9/1658
See application file for complete search history.

(56) References Cited

U.S. PATENT DOCUMENTS

| | | | | |
|---|---|---|---|---|
| 9,050,200 | B2 * | 6/2015 | Digiovanna | G06N 3/08 |
| 11,034,019 | B2 * | 6/2021 | Tellex | B25J 9/163 |
| 2013/0218335 | A1 * | 8/2013 | Barajas | B25J 9/163 |
| | | | | 700/246 |
| 2018/0272535 | A1 * | 9/2018 | Ogawa | B25J 13/085 |
| 2019/0126472 | A1 * | 5/2019 | Tunyasuvunakool | G06N 3/08 |
| 2019/0272465 | A1 * | 9/2019 | Kimura | G06N 3/006 |
| 2020/0023514 | A1 * | 1/2020 | Tellex | G06N 3/08 |
| 2020/0226467 | A1 * | 7/2020 | Fainekos | G06T 7/77 |
| 2020/0276703 | A1 * | 9/2020 | Chebotar | B25J 9/1664 |
| 2021/0334657 | A1 * | 10/2021 | Jordan | G06N 3/061 |
| 2022/0197306 | A1 * | 6/2022 | Cella | G06N 3/088 |
| 2023/0031545 | A1 * | 2/2023 | Oleynik | G05B 19/42 |
| 2023/0241772 | A1 * | 8/2023 | Schillinger | B25J 13/08 |
| | | | | 700/250 |

(Continued)

FOREIGN PATENT DOCUMENTS

| | | | | |
|---|---|---|---|---|
| CN | 109726813 A | * | 5/2019 | ............. B25J 9/161 |
| DE | 102019134794 B4 | * | 6/2021 | |

OTHER PUBLICATIONS

DE-102019134794-B4 translation (Year: 2021).*

(Continued)

*Primary Examiner* — Kyle T Johnson
(74) *Attorney, Agent, or Firm* — NIXON PEABODY LLP

(57) ABSTRACT

Systems and methods are provided for learning control policies that are safe, robust, and interpretable in developing robotic systems. In one example, a signal temporal logic is used to evaluate and rank the quality of demonstrations. The temporal logic based specifications allow generation of non-Markovian rewards, and also define causal dependencies between tasks such as sequential task specifications.

17 Claims, 29 Drawing Sheets

(56) References Cited

U.S. PATENT DOCUMENTS

2024/0173855 A1* 5/2024 Thon ...................... B25J 9/163

OTHER PUBLICATIONS

CN-109726813-A translation (Year: 2019).*
Elaborating on Learned Demonstrations with Temporal Logic Specifications (Year: 2020).*
Robust Model Predictive Control for Signal Temporal Logic Synthesis (Year: 2015).*
A Policy Search Method for Temporal Logic Specified Reinforcement Learning Task (Year: 2018).*
Learning From Demonstrations Using Signal Temporal Logic in Stochastic and Continuous Domains (Year: 2021).*

* cited by examiner

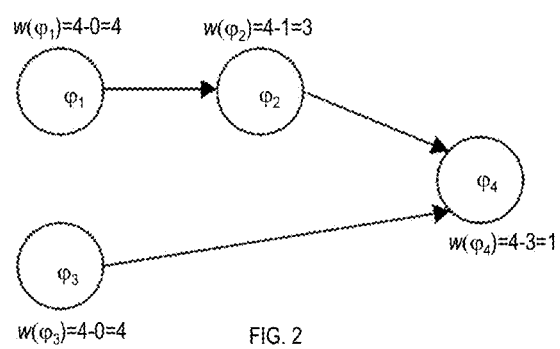
FIG. 7A     FIG. 7B
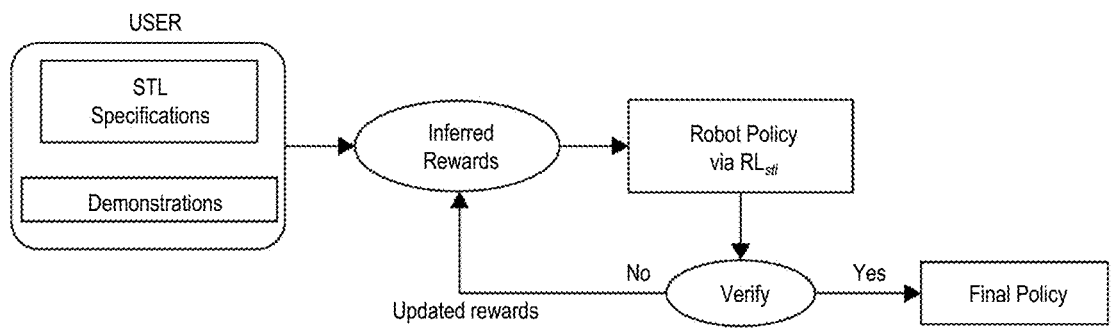
FIG. 8

Demo 1

Demo 2

Robot Policy

Grid-world game setup

Example user demonstration

Demo 1

Demo 2

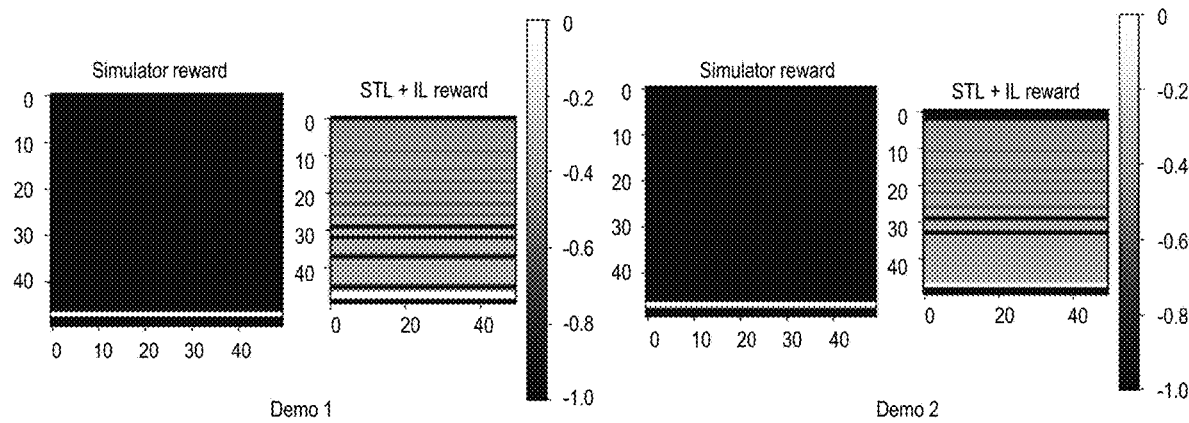
FIG. 19A
FIG. 19B
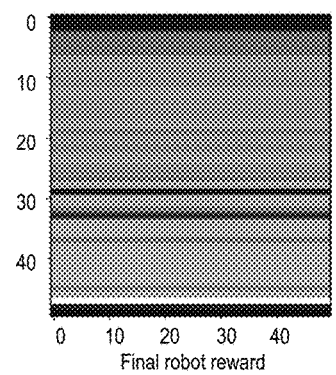
FIG. 19C

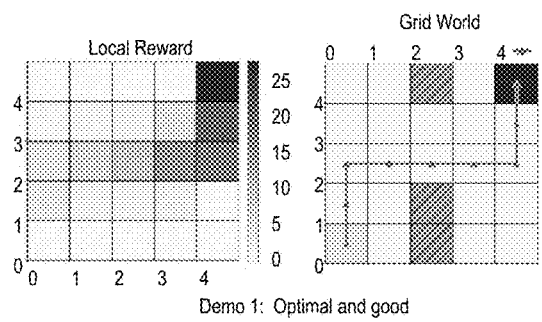
Demo 1: Optimal and good
FIG. 20A
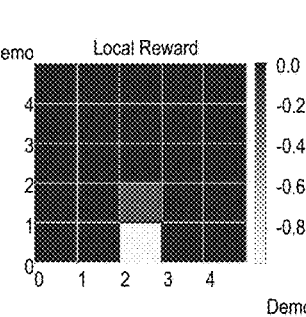
Demo 2: bad
FIG. 20B
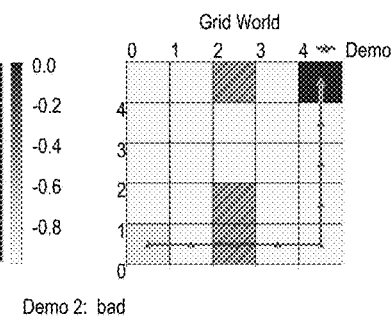
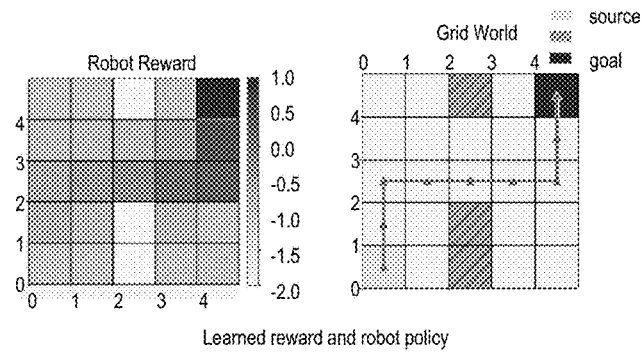
Learned reward and robot policy
FIG. 20C

GT reward function

MaxEnt-IRL

MCE-IRL

Overview of PeGLearn algorithm

Step 1

Step 2

Step 3

Demonstration 1

Demonstration 2

Intermediate Graph

Final DAG

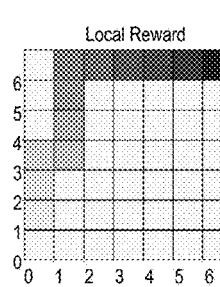
FIG. 28B
Demonstration 1
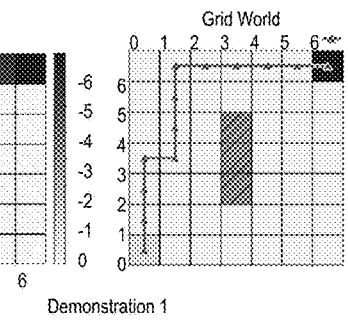
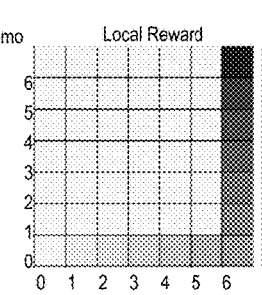
FIG. 28C
Demonstration 2
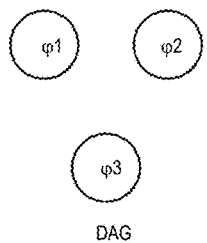
DAG
FIG. 28A
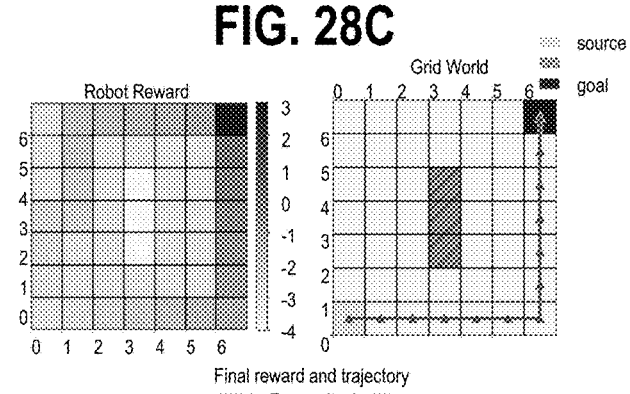
FIG. 28D
Final reward and trajectory Driving layout Baseline rewards Rewards from inferred DAG Learned DAG Experts Intermediates Novices Cumulative

| $\varphi$ | $\rho(\varphi, \mathbf{x}, t)$ |
|---|---|
| true/false | $\top/\bot$ |
| $\mu$ | $f(\mathbf{x}(t))$ |
| $\neg \varphi$ | $-\rho(\varphi, \mathbf{x}, t)$ |
| $\varphi_1 \wedge \varphi_2$ | $\otimes(\rho(\varphi_1, \mathbf{x}, t), \rho(\varphi_2, \mathbf{x}, t))$ |
| $\varphi_1 \vee \varphi_2$ | $\oplus(\rho(\varphi_1, \mathbf{x}, t), \rho(\varphi_2, \mathbf{x}, t))$ |
| $\mathbf{G}_I(\varphi)$ | $\otimes_{\tau \in t+I}(\rho(\varphi, \mathbf{x}, \tau))$ |
| $\mathbf{F}_I(\varphi)$ | $\oplus_{\tau \in t+I}(\rho(\varphi, \mathbf{x}, \tau))$ |
| $\varphi \mathbf{U}_I \psi$ | $\oplus_{\tau_1 \in t+I}(\otimes(\rho(\psi, \mathbf{x}, \tau_1), \otimes_{\tau_2 \in [t, \tau_1]}(\rho(\varphi, \mathbf{x}, \tau_2))))$ |

FIG. 33

SYSTEM AND METHOD FOR ROBOT LEARNING FROM HUMAN DEMONSTRATIONS WITH FORMAL LOGIC

CROSS-REFERENCE TO RELATED APPLICATIONS

This application claims benefit under 35 U.S.C. § 119 (e) of U.S. Provisional Application No. 63/139,540 filed Jan. 20, 2021, the contents of which are incorporated herein by reference in its entirety.

STATEMENT REGARDING FEDERALLY SPONSORED RESEARCH OR DEVELOPMENT

This invention was made with government support under Grant Nos. 1932620 and 1837131 awarded by the National Science Foundation. The government has certain rights in the invention.

BACKGROUND

The following description includes information that may be useful in understanding the present invention. It is not an admission that any of the information provided herein is prior art or relevant to the presently claimed invention, or that any publication specifically or implicitly referenced is prior art.

Programming robots to perform various tasks and also generalize to new/similar tasks requires great expertise in robotics-both, software and hardware. To enable robots to (cooperatively) assist humans or common users (such as in households, warehouses, etc.), they need to be able to learn and adapt to dynamic environments and respond to various human behaviors. However, humans are not always expert programmers to program such robots and generally, aren't also aware of the capabilities of the robot. To overcome this, Learning-from-Demonstrations (LfD) is a machine learning paradigm that is widely used to learn robot control actions or schemes by observing human actions and/or behaviors rather than explicit programming, since demonstrations model the intentions or behaviors of the human. In other words, humans can directly demonstrate or teach robots to perform tasks, therefore enabling human-robot interactions (HRI). This type of learning requires robots to observe humans and also explore the environment to gain new experiences.

However, humans are not always skilled at performing tasks perfectly or optimally. Hence, the human demonstrations may be subject to imperfections or "noise". As an example, showing incorrect or inaccurate demonstrations may cause the robot to learn undesirable and unsafe behaviors that might harm the human or the robot's body itself, which are costly. In addition, safely providing demonstrations requires great skill, such as showing an autonomous car how to maneuver around obstacles or in urban traffic, demonstrating to a robot on how to safely pick up objects with different properties, etc. For example, a robot needs to understand how to pick up a brick vs carefully picking up expensive glass, as the penalty of dropping the glass is high.

SUMMARY

The present invention relates to methods and systems for robotic learning. As mentioned above, current approaches employ learning from demonstrations for learning a control policy that is used to determine robotic behavior. However, a demonstration is an inherently incomplete and implicit specification of the robot behavior in a specific fixed initial configuration or in the presence of a single disturbance profile. The control policy that is inferred from a demonstration alone may thus perform unsafe or undesirable actions when the initial configuration or disturbance profile is different. Thus, learning from demonstrations lacks robustness. Further, some demonstrations are a better indicator of the desired behavior than others, and the quality of a demonstration often depends on the expertise of the user providing the demonstration. There is also lack of metrics to evaluate the quality of demonstrations on tasks. Further, demonstrations do not specify safety conditions for the robot, and safely providing a demonstration is itself challenging and difficult to perform. Further, there may be many optimal demonstrations, each trying to optimize a particular objective based on user preference.

Further still, in order to learn a control policy using LfD, neural networks are implemented, which require tens of thousands of datasets for training and validation, which greatly increase complexity in terms of space and time considerations. As a result, current approaches that rely on LfD are not practical and cannot be employed in real-world scenarios.

In order to at least partially address the above-mentioned issues, the inventors have developed a system for reinforcement learning, the system comprising: one or more processors; a computer-readable medium storing executable instructions that, when executed, cause the system to perform operations comprising: receive a set of demonstrations, the set of demonstrations obtained via interaction of an agent with an environment determined according to sensor input from one or more sensors of the agent; receive a set of specifications, the set of specifications providing descriptions of one or more tasks and/or one or more objectives; convert the set of specifications into a formal language; evaluate the set of demonstrations based on the set of specifications in formal language; generate a robustness value for each demonstration in the set of demonstrations based on the evaluation; infer rewards for each demonstration based on the robustness value; learn a control policy based on the inferred rewards; and provide one or more control signals to one or more actuators of the agent based on the control policy.

In one example, a method for training a robot comprises integrating one or more formal logics with a robot learning-from-demonstrations (LfD) paradigm to evaluate and/or rank one or more of a quality of human demonstrations and robot response data. The method may further comprise evaluating a quality of a demonstration in the LfD paradigm to determine one or more of rewards and costs. The rewards and/or costs may be utilized by robotic learning algorithms to generate one or more robot behaviors. The method may further comprise generalizing to similar new tasks without requiring additional demonstrations on the new tasks. In contrast, a learning algorithm, such as MCR-IRL performs poorly in generalization and often requires additional demonstrations or monitoring by an expert user to provide corrective actions.

By integrating one or more formal languages with LfD, the robot may learn from far fewer number of demonstrations over the current state-of-the-art, such as MCE-IRL algorithm. Further, with the integrated approach, the agent (e.g., a robot) may learn from even sub-optimal and imperfect human demonstrations over the state-of-the-art. Additionally, similar new tasks may be generalized without additional demonstrations for the similar new tasks. As a result, constant monitoring by an expert user to provide corrective actions, for example, is reduced. This leads to improved and efficient robot learning process.

Further, integration of LfD with formal language specifications has enabled machine learning-based approaches to be realized on real-world robots, without requiring significant intervention or supervision of humans, which none of the prior works have been able to accomplish. Specifically, a human can express objectives for the robot in a very intuitive language of temporal logic and show how to perform these objectives without the need to manually program the robot. Then, the robot can understand and learn the demonstrated behaviors by recognizing correct (optimal and safe) and incorrect behaviors when the human demonstrations are limited in number and not perfect.

As an example, users/humans may intuitively express various factors such as: task descriptions, objectives, convey intent, robot behavior expectations-safety and reliability, etc. in the form of logical formulas or constraints-called formal logics (FLs). Examples of FLs include propositional logic, first-order logic, temporal logic (TL), computation tree logic. There are also multiple variants of temporal logic-linear TL (LTL), metric TL (MTL), signal TL (STL), etc. The defined human factors in FLs and user demonstrations may be used to evaluate and/or rank a quality of such demonstrations that characterize one or more behaviors to be learnt by the robot. These behaviors may be represented as rewards or cost functions for machine learning such as reinforcement learning or any other semi-supervised or unsupervised learning procedure to learn safe robot control policies and is robust to errors or uncertainties in the environment.

In one example, quantitative semantics of the one or more formal logics may be used to numerically evaluate "how well" (in a quantitative sense) a user's demonstration performs on the defined tasks/objectives. The numeric evaluation may be used to define the rewards/costs for each demonstration, thereby capturing the behavior of each user preference. Finally, the rewards of all users may be combined into a single reward function that is used by the robot to learn an optimal behavior that meets all the user-defined specifications.

In this way, a robot may learn from only a handful of demonstrations that may be sub-optimal or imperfect. On the other hand, previous approaches require several hundreds of perfect/optimal demonstrations or require constant monitoring by an expert human to provide corrections whenever a robot performs an undesirable action.

Further, by integrating formal logic with LfD, the policies are learnt with significantly fewer demonstrations, which greatly improves speed and efficiency of learning while enabling generalizability to unknown scenarios.

The applications of LfD and formal logic in inferring control policies are numerous: (a) in households, robots can provide assistance in cooking, assembling furniture, laundry, etc., (b) in manufacturing and industrial setup, a robot can help in pick-and-place tasks, performing tasks in hazardous situations, aids for natural disasters, (c) in medical industries, robots are useful for robotic surgery, elder-care/assistance, staff assistance during pandemics, (d) in autonomous driving, (e) insulin delivery devices.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

FIG. 7A depicts example demonstrations in a grid-world;

FIG. 7B depicts example weights on node in a DAG;

FIG. 8 depicts an example LfD-STL framework;

FIGS. 10A and 10B pertain to Frozenlake and FIG. 10C pertains to Mountain Car;

FIGS. 19A and 19B show simulator reward (left figures), while right figures show the rewards based on STL specifications;

FIG. 19C shows rewards inferred from demonstrations;

FIGS. 20A-20C show results for 5×5 grid with 20% stochasticity. Inferred rewards are shown in left figures. Right figures show the grid-world with start state (light grey), goal (dark grey), obstacles (grey hatching) and demonstration/policy (grey arrow). Darker greys represent higher rewards;

FIGS. 28A-28D show results for 7×7 grid. Inferred rewards are shown in left figures; Right figures show the grid-world with start state (light grey), goal (dark grey), obstacles (grey hatch) and demonstration/policy (grey arrow);

FIGS. 32A-32C show DAG for each level of expertise: Experts, Intermediates and Novices respectively; and FIG. 32D shows DAG for all surgeons, without discriminating expertise levels; and FIG. 33 shows an example quantitative semantics of STL.

Figure 1:
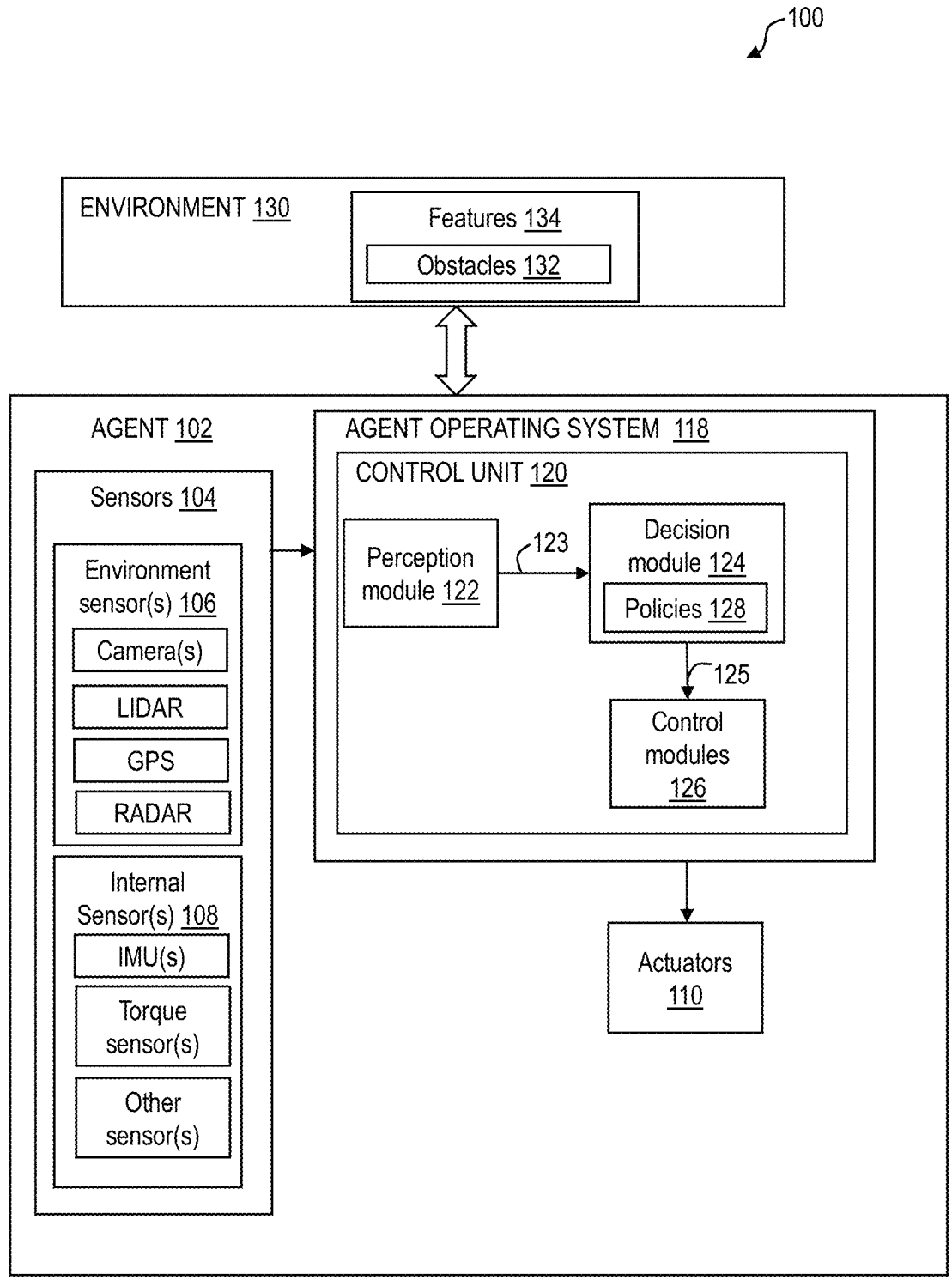
FIG. 1 depicts an overview of an example robotic system, according to an embodiment of the disclosure.

In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced.

DETAILED DESCRIPTION

Unless defined otherwise, technical and scientific terms used herein have the same meaning as commonly understood by one of ordinary skill in the art to which this invention belongs. One skilled in the art will recognize many methods and materials similar or equivalent to those described herein, which could be used in the practice of the present invention. Indeed, the present invention is in no way limited to the methods and materials specifically described.

In some embodiments, properties such as dimensions, shapes, relative positions, and so forth, used to describe and claim certain embodiments of the invention are to be understood as being modified by the term "about."

As used herein, the term "real-time" is defined to include a process occurring without intentional delay. For purposes of this disclosure, the term "real-time" will additionally be defined to include an action occurring within 2 seconds. For example, if data is acquired, a real-time response (e.g., action) based on that data would occur within 2 seconds of the acquisition. Those skilled in the art will appreciate that most real-time processes will be performed in substantially less time than 2 seconds.

As used herein, the term "near real-time" is defined to include a process occurring without intentional delay, given the processing limitations of the system and the time required to acquire the data.

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Referring to FIG. 1, it illustrates an example system 100 for learning control policies using an integrated learning from demonstrations (LfD) paradigm, according to one embodiment. The system 100 comprises an agent 102 interacting with and operating in an environment 130. In particular, the agent 102 is configured to perform behaviors or actions by interacting with the environment 130. Thus, the environment 130 represents the domain or surroundings in which the agent 102 operates and the environment 130 imposes constraints on the behaviors of the agent 102.

In one example, as shown, the agent 102 may be a robotic system (e.g., a human service robot), and the environment 130 may be a home. The robotic system may be configured to move around the home and perform household tasks, such as picking up objects on the floor, opening curtains, retrieving objects from higher locations, etc. While the present example shows the agent 102 configured as a robotic system, the agent 102 may be any cyber-physical system or an intelligent system, such as an autonomous vehicle, a drone, etc. As an example, the agent 102 may be an autonomous vehicle and the environment 130 may represent a geographical region through which the autonomous vehicle is travelling In yet another example, the agent 102 may be configured as an automated insulin delivery system, and the environment 130 may be a patient to whom the automated delivery system delivers an amount of insulin in an adaptive manner based on the insulin needs of the patient.

In some examples, the agent 102 may be a component of a computerized game in a corresponding gaming environment.

The environment 130 may comprise features 132, which may include obstacles 134, for example. The features 132, including the obstacles 134, may be detected by the agent 102. For examples, the features 132 may include one or more surfaces that physically represent the environment 130. Accordingly, the features 132 may include topographical features of surfaces, texture features of surfaces, temperature of surfaces, reflectivity of surfaces, state of matter of surfaces (e.g., solid, liquid, gas), other properties of surfaces, etc. The obstacles 134 may include but not limited to one or more objects, one or more organisms, a sound source, etc. The features 132 in the environment 130 may be determined based on one or more models (e.g., deep learning models that detect and track objects, and hence inform the locations of the objects.) Example implementations of models include use of kernel matrices, neural networks, classifiers, etc.

The agent 102 comprises one or more sensors 104, a control unit 120 comprising one or more processors, and one or more memories, and one or more actuators 110. The one or more sensors 104 may include any device, component and/or system that can detect, and/or sense something. Further, the one or more sensors 104 can be configured to detect, and/or sense in real-time. In some arrangements, when more than one sensors are included, the sensors 104 may work independently from each other. Alternatively, two or more of the sensors can work in combination with each other. In such case, the two or more sensors can form a sensor network. The one or more sensors 104 may be operatively connected to the control unit 120. For example, the one or more sensors 104 may be operatively connected to one or more processors (not shown), one or more memories (not shown), and/or another element of the agent 102 (e.g., other robotic systems, such as arm control system, traversing system, etc.). As discussed below, the one or more sensors may generate sensor datasets useable by the one or more processors according to instructions stored in one or more memories to perform various functions.

The one or more sensors 104 may include one or more environment sensors 106. The one or more environment sensors 106 may monitor the environment 130 of the agent 102. The one or more environment sensors 106 may be configured to acquire, and/or sense environment data. Environment data includes and data or information about the environment in which the agent 102 is located or one or more portions thereof. For example, the one or more environment sensors 106 can be configured to detect, quantify and/or sense objects, in at least a portion of the environment of the agent 102 and/or acquire information/data about such objects.

The environment sensors 106 can include one or more camera(s). In various implementations, the camera(s) can be high dynamic range (HDR) cameras and/or infrared (IR) cameras. In various implementations, the camera(s) can be hyperspectral camera(s) capable of detecting light outside the visible light spectrum. In various implementations, the one or more environment sensors 106 may include one or more radar sensors, one or more LIDAR sensors 234, one or more navigation sensors (e.g., GPS).

The one or more sensors 104 may include one or more internal sensor(s) 108. The one or more various embodiments, the internal sensor(s) 108 can be configured to detect, and/or sense position and orientation changes of the agent 102 such as, for example, based on rotation or movement of various actuatable joints or motors of the agent, when configured as a robotic system. In various implementations, the internal sensor(s) 108 can include one or more accelerometers, one or more gyroscopes, an inertial measurement unit (IMU), and/or other suitable sensors. The internal sensor(s) 108 can also include potentiometers, torque sensors, etc.

Various examples of different types of sensors were described above; however, it will be understood that the embodiments are not limited to the particular sensors described. In general, the one or more sensors 102 may include any other type of sensor that can provide information describing the environment 130 to the agent 102 and/or states of the agent 102 itself.

As an example, the agent 102 may sense a state of the environment 130 via the one or more sensors 104. The one or more processors, may then implement various algorithms based on the sensor data to determine an action to perform. The actions, when executed, may cause the state of the environment to change.

The control unit 120 comprises a perception module 122 configured to receive sensor data from the one or more sensors 104 and process the sensor data into a meaningful information, called state 123 for the agent 102. Further, the control unit 120 comprises a decision module 124 that utilizes the states to plan behaviors and/or actions. In particular, the decision module 124 may store a reinforcement learning algorithm, such as a Q-learning network, for inferring a control policy for the agent based on which behaviors and/or actions 125 may be planned. Further, the decision module 124 may also store a set of control policies 128 based on which an optimum policy may be selected. The control unit 120 further comprises one or more control modules 126 configured to translate the planned behaviors into electric signals that are executed on the actuators 110 to realize the actions. All of these functions are governed by an operating system 118 or a supervisor.

In various implementations where the multiple robots are implementes, a distributed architecture for supervision may be used.

During reinforcement learning, a set of demonstrations may be provided, where demonstrations are the observations of behaviors from agents acting in an environment. Demonstrations may be provided through observations (e.g., looking at behaviors captured on camera/video, YouTube, motion sensors, etc.), teleoperation (e.g., demonstrators controlling robotic systems via analog controllers (e.g., joysticks) to perform tasks, and/or kinesthetic teaching (e.g., through physical guidance (e.g., hand-holding) of the robot to accomplish tasks.

As discussed herein, the tasks to be accomplished are described in formal languages such as temporal logics. The temporal logics include, but not limited to Signal Temporal Logic, Linear Temporal Logic, and Computation Tree Logic. These descriptions using temporal logics (that is, formal languages) can also be provided via natural language that may be then converted to machine-understandable temporal logic. The demonstrations and task descriptions are fed to a Reward-Learning module that quantifies the behaviors via reward or cost functions. Reinforcement Learning (RL) is then performed on the rewards to extract control policies for the agent.

As discussed above, learning from demonstrations (LfD) is an algorithmic paradigm in which control policies for robots can be extracted from human demonstrations. LfD may be performed using behavior cloning via supervised learning or inverse reinforcement learning (IRL). Behavior cloning uses supervised learning to model/mimic the actions of a teacher by mapping states to actions. In IRL, a reward function is derived from a set of human demonstrations for RL tasks. Apprenticeship learning (AL) aims to extract control policies from rewards inferred using IRL. However, designing rewards for RL is a non-trivial task and typically requires domain expert knowledge. Further, learning noisy or incorrect reward functions can lead to the agent performing unintended or unsafe behaviors. Further, practically, there are some limitations to the LfD paradigm: (i) a demonstration is seldom optimal and is always susceptible to noises or disturbances due to motions of the user or uncertainties in the environment. The control policy inferred from such a demonstration may thus perform unsafe or undesirable actions when the initial configuration is slightly perturbed. Thus, LfD lacks robustness; demonstrations are not always equal (e.g., some are a better indicator of the desired behavior than others), and the expertise of the demonstrator determines the quality of the demonstration; and (iii) safety conditions for the robot cannot be explicitly specified by demonstrations, and safely providing a demonstration requires highly skilled demonstrators.

The inventors herein have recognized the above disadvantages and provide a reward-learning method wherein LfD is integrated with formal logic to learn rewards based on which a control policy is inferred. As an example, demonstrations convey intended behaviors of the user and robot. That is, demonstrations can be interpreted as partial specifications for the robot behavior, as well as a representation of the partial (possibly sub-optimal or incorrect) control policy. On the other hand, temporal logic specifications represent high-level mission objectives for the robot, but do not indicate how to achieve the objectives. Temporal logic specifications can also encode information about the environment such as rules to be obeyed by the agent. The approach discussed herein seeks to use both, the user demonstrations and the specifications to learn rewards from which a control policy can be extracted via RL. In this integrated framework (also referred to herein as LfD+formal logic framework), the user explicitly provides demonstrations and high-level specifications in a mathematically precise and unambiguous formal language, which may be a temporal logic (such as Signal Temporal Logic (STL)). A temporal logic formula evaluates a temporal behavior of a system (in this case, a demonstration or agent's policy) and provides a quantity that indicates how well the system satisfied the formula via a fitness quantity called robustness that is then used to define rewards. In general, the temporal logic specifications tell the agent "what to do," while the rewards obtained by evaluating the quality of demonstrations tell the agent "how to do it". Temporal logic does not define the entire reward function, but only some parts or sub-spaces of it and therefore the integrated framework uses demonstrations for learning rewards.

Figure 2:
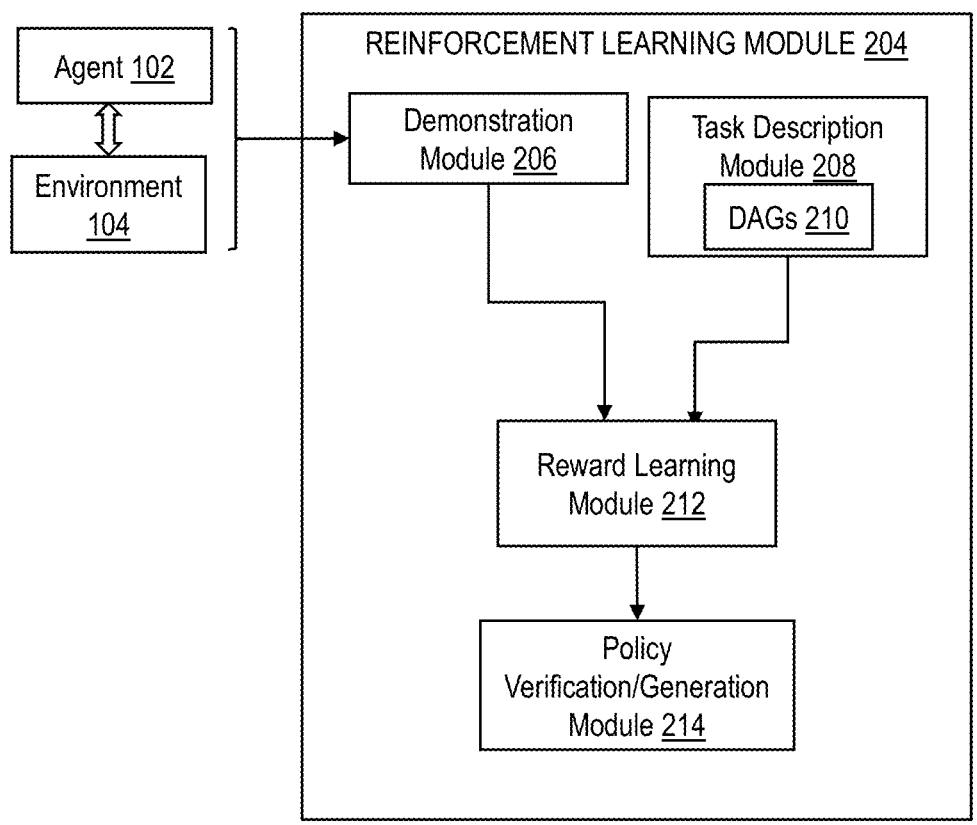
FIG. 2 depicts an overview of an example reinforcement learning module that may be implemented with the robotic system of FIG. 1, according to an embodiment of the disclosure.

An example reinforcement learning module 204 that may be implemented in the decision making module 124 for performing reward-learning based on demonstrations and formal logic is shown at FIG. 2. The reinforcement learning module 204 comprises a demonstration module 206 that receives sensor data from the agent and generates a demonstration dataset based on interactions of the agent 102 with the environment 130. As used herein, the term "environment" (E) refers to a tuple E=(S, A) consisting of the set of all possible states S defined over $R^n$ and actions A, where n is the dimension of the real space. A goal or objective in E is an element of S.

As used herein, the term "demonstration" (or a policy or trace) refers to a finite sequence of state-action pairs. Formally, a demonstration d of length $L \in \mathbb{N}$ is given as d={(s1, a1), (s2, a2), . . . , (sL, aL)}, where si∈S and ai∈A. That is, d is an element of $(S \times A)^L$. Demonstration is alternatively referred to as "policy" or "trace" herein.

The reinforcement learning module 204 further comprises a task description module 208 that generates high-level specifications in a mathematically precise and unambiguous formal language (e.g., temporal logic). A temporal logic formula evaluates a temporal behavior of a demonstration and provides a quantity that indicates how well the demonstration satisfied the formula via a fitness quantity called robustness that is then used to define rewards. Thus, the demonstration module 206 generates the demonstration dataset D={d1, d2, d3, d4 . . . . Dm} comprising a set of demonstrations in the environment and the task description module 208 generates a set of high-level specifications comprising one or more requirements, the one or more requirements comprising hard requirements and soft requirements. The goal is to infer a reward function such that the resulting robot policy obtained by a model-free RL algorithm, satisfies all the requirements of the specifications. Thus, the demonstration dataset and task descriptions are fed to a reward learning module 212 that implements a reward learning method (described below at FIGS. 3 and 4) to quantify the demonstrations via reward or cost functions. Further, the reinforcement learning module 204 comprises a policy generation/verification module 212 that is configured to perform RL (e.g., via Q-learning) on the rewards to extract control policies for the agent. The task specifications use the quantitative semantics to analyze the preferences and performance of demonstrations with respect to the tasks. Some software toolboxes that possess these features are Breach (Donzé A. (2010) Breach, A Toolbox for Verification and Parameter Synthesis of Hybrid Systems. In: Touili T., Cook B., Jackson P. (eds) Computer Aided Verification. CAV 2010. Lecture Notes in Computer Science, vol 6174. Springer, Berlin, Heidelberg.), S-TaLiRO (Annpureddy Y, Liu C, Fainekos G, Sankaranarayanan S (2011)S-TaLiRo: a tool for temporal logic falsification for hybrid systems. In: TACAS. pp 254-257), and RTAMT (Nickovic, Dejan & Yamaguchi, Tomoya. (2020). RTAMT: Online Robustness Monitors from STL.), the contents of which are incorporated herein in its entirety.

Once rewards are learned, a verification-in-the-loop is used in conjunction with Reinforcement Learning on the rewards to ensure that the learned robots' behaviors meet the formal task specifications. This improves safety and performance, and hence very well-suited for safety and time-critical applications.

This unique feature enables the agent to learn from even imperfect demonstrations due to the self-corrective nature enforced by the formal task descriptions.

In this way, through integration of LfD and temporal logic, machine learning based approaches can be realized on real-world robots, without requiring significant intervention or supervision of humans, which none of the prior works have been able to accomplish. Specifically, a human can express objectives for the robot in a very intuitive language of temporal logic and show how to perform these objectives without the need to manually program the robot. Then, the robot can understand and learn the demonstrated behaviors by recognizing correct (optimal and safe) and incorrect behaviors when the human demonstrations are limited in number and not perfect. Thus, by implementing temporal logic specifications and evaluating demonstrations based on the temporal logic specifications, significant improvement in the field of robotic learning and practical realization of machine learning based approaches on real-world robots is achieved.

As one example, in households and/or warehouse environments, robotic systems can provide great help in performing repetitive tasks such as doing the laundry, taking out trash, cutting food items, picking-and-placing items, assembling furniture etc. Although, these are generic tasks similar to the vacuum cleaner robots, they require complex object manipulation behaviors which can be taught by humans and also provide a safe operating environment. Accordingly, in one embodiment, the reinforcement learning method that utilizes reward learning based on learning from demonstrations and formal logic specifications, can be utilized in robotic agents in households and/or warehouse environments.

As another example, in physiotherapy, the self-corrective nature of reinforcement learning method utilizing reward inference based on LfD and temporal logic specifications can greatly aid patients who are unable to correctly perform routine actions during recovery. For example, automated insulin-delivery simulation models for Type-1 diabetes may determine control policies for insulin delivery based on LfD and temporal logic specification.

As another example, policy inference from rewards inferred using the LfD and temporal logic framework can be used in drones and multi-robot coordination systems. For example, in order to determine control policies for controlling drones for rescue, fire hazards and other military applications, LfD and temporal logic based specification may be implemented. Drones require expert operators to perform complex navigation maneuvers, and fully autonomous drones need to learn to navigate in new terrains/environments which they may not have been trained on. Hence, drones implemented with the reward-learning methods described herein can learn from the history of flight data and perform self-corrections for navigation.

Furthermore, collective behavior of multi-robot coordination systems may be improved based on LfD and temporal logic frame work described herein.

In some embodiments, a human support robotic system can move around the house, keep watch over family members, and fetch objects. It is operable by voice command or by teleoperation. In one example, the human support robotic system includes a highly maneuverable, compact, and lightweight cylindrical body with a folding arm that enables it to pick up objects off the floor, suction up thin objects, retrieve objects from high locations, open curtains, and perform other household tasks. The human support robotic system is equipped with the following sensors: Microphone Array, RGB-D Camera, Wide-Angle Camera, Force Torque Sensor, Stereo Camera, IMU and Laser Range Sensor. The software stack consists of JetPack, L4T, Robotic Operating System (ROS), OpenCV, CUDA. The LfD and temporal logic framework may be implemented on real-world robots, such as the human support robotic system, to provide assistance for healthcare and households.

Demonstrations are collected by teleoperating the robot for tasks such as navigating around the environment, picking and placing objects, etc. Since teleoperation is used, the robot does not have to worry about correspondence problems as in visual observation. The task descriptions could be provided via voice commands such as "place the object inside the refrigerator" or "close the door", etc. These commands directly translate to intuitive temporal logic representations for the robot. Perception algorithms that employ deep learning would handle object detection and tracking, and hence inform the locations of relevant objects. This would also aid in the localization of the robot with respect to the objects. The robot uses all this information to learn the reward signals and hence to autonomously navigate and perform the task. Since The lfD and temporal logic framework can generalize to new, but similar tasks, only a few demonstrations can be shown. That is, a demonstration for "pick up box on the floor" can be used to learn the behavior for "pick up the bottle on the table" without providing a demonstration for the same.

All ground vehicles, whether autonomous or not, are governed by the rules and regulations of roads which can be readily expressed in formal languages. The LfD and temporal logic framework can be applied to urban and residential navigation problems using high fidelity simulators. In the case of autonomous vehicles, demonstrations can be obtained by visual learning (watching other drivers) or kinesthetic teaching (driving the vehicle). This can be extended to robots deployed in warehouses, since the environment characteristics are similar.

Similarly, in the case of drone control, the aviation rules would apply. Drones of this sort can be used in search-and-retrieve operations. The LfD and temporal logic framework also extends to multi-robot scenarios where robots are used for search-and-rescue in unknown terrains. When controlling multiple agents in a group, a single drone or a few drones can be regarded as leader(s) that are trained by human operator(s) via teleoperation demonstrations. The other drones can then infer the behaviors from the leader(s), without requiring human demonstrations, to accomplish tasks collectively. This is particularly useful in unknown terrains where resources (e.g., drone-to-drone communication, charging stations) are limited and it is crucial to develop resource-aware systems that are reliable.

In yet another embodiment, an automated insulin delivery system consists of a glucose monitor/sensor, an insulin pump and a control algorithm that decides how much insulin needs to be injected based on the glucose levels. This system can operate on wireless (e.g., Bluetooth) and/or wired communications between the pump and sensor. The core specification of this system is to keep the blood glucose levels in the acceptable range, which is the main specification for the learning algorithm. The LfD and temporal logic framework can analyze the behavior of the patient and learn when and how much insulin needs to be delivered, which produces a robust adaptive system based on each patient's conditions. As the LfD and temporal logic framework is computationally more efficient, it can be programmed onto the wearable pump to regulate insulin.

Figure 3:
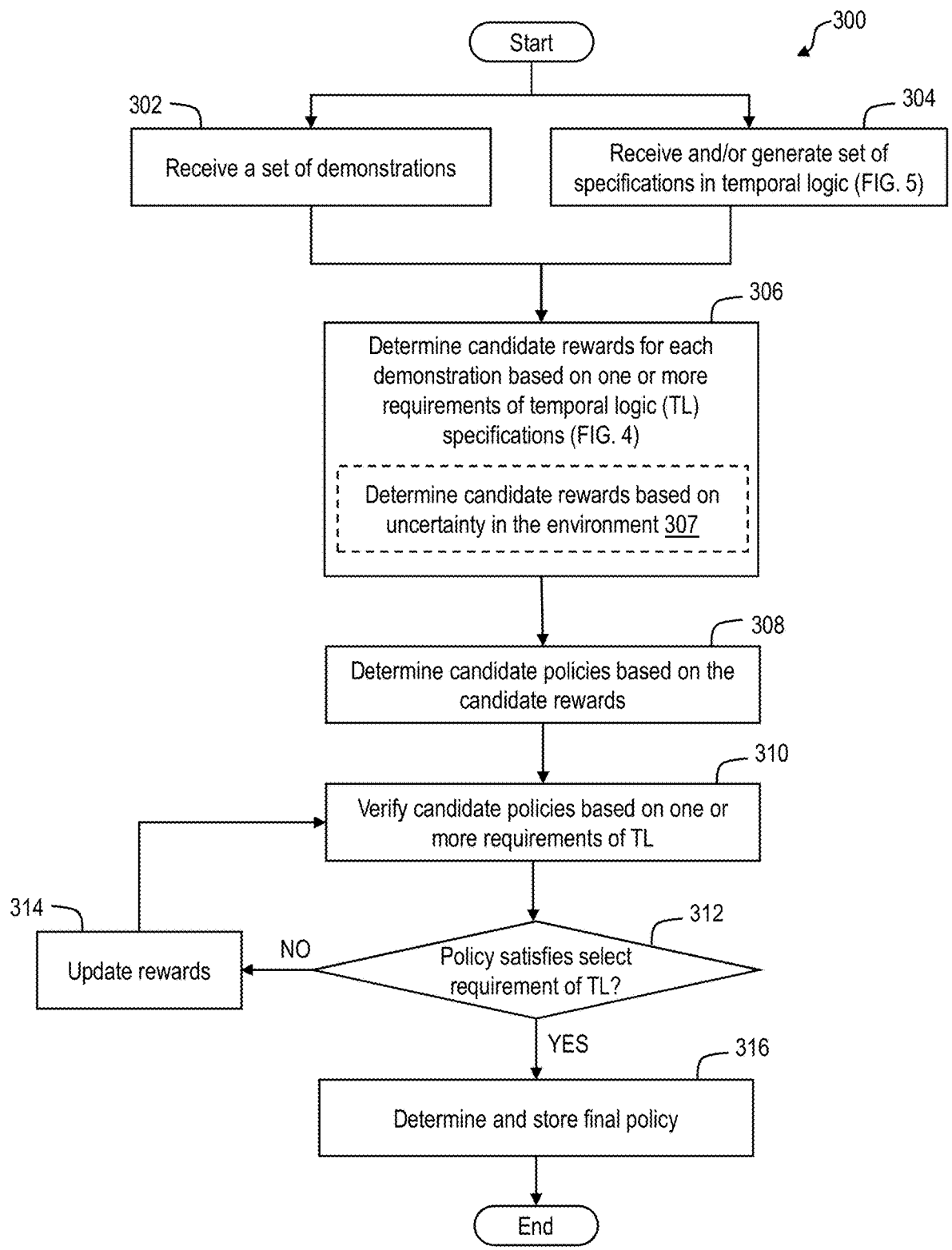
FIG. 3 depicts a flow chart illustrating an example method for learning control policies for an example robotic system, according to an embodiment of the disclosure.

Referring to FIG. 3, it shows a flow chart illustrating a high-level method 300 for learning control policies based on rewards inferred from demonstrations and temporal logic specifications, according to an embodiment of the disclosure. The method 300 and other methods described herein may be implemented by a processor of a control unit, such as control unit 120 at FIG. 1, according to instructions stored in memory. While the method 300 will be described with respect to FIG. 1, the method may be implemented by other systems without departing from the scope of the disclosure.

At 302, method 300 includes receiving a set of demonstrations, and at 304, the method 300 includes receiving or generating a set of specifications in temporal language. Using the set of specifications represented in temporal logic, complex tasks involving multiple goals can be expressed, which cannot be easily encoded or represented in traditional IRL. In one example, the set of demonstrations may be acquired via one or more sensors, such as sensors 104 at FIG. 1. In some examples, the set of demonstrations may be input by a user, via a user interface of a system, such as a user interface of the agent at FIG. 1. Further, with regard to the set of specifications, they may be provided by the user, in one example. Alternatively, in some examples, the set of specifications may be automatically generated. An example method for automatically generating the set of task descriptions is shown and described with respect to FIG. 5. The set of task descriptions may be arranged in a directed acyclic graph (DAG) structure. An example DAG structure is shown at FIG. 7B At 306, the method 300 includes determining candidate rewards for each demonstration based on one or more requirements of the temporal logic specifications. The one or more requirements include a set of hard requirements and a set of soft requirements. Example method for determining candidate reward is discussed below at FIG. 4. In stochastic environments, the candidate rewards are based on uncertainty in the environment. An example of determining rewards based on uncertainty in the environment is shown further below at with respect to Example 2.

Figure 4:
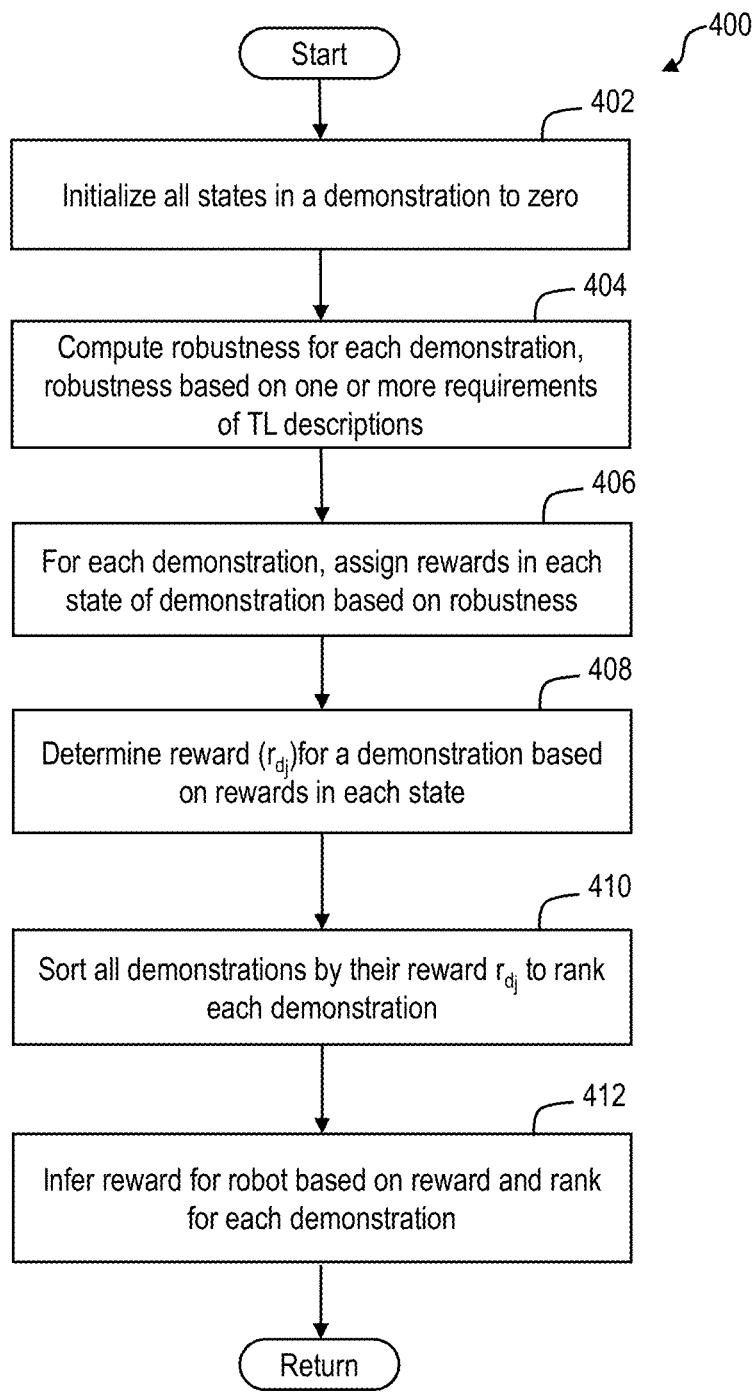
FIG. 4 depicts a flow chart illustrating an example method for inferring rewards from demonstrations during a learning process for an example robotic system, according to an embodiment of the disclosure.

Turning to FIG. 4, it shows an example method 400 for determining candidate rewards for demonstrations based on the set of specifications. At 402, the method 400 includes initializing all states in a demonstration to zero.

Next, at 404, the method 400 includes computing robustness for each demonstration, wherein the robustness is based on one or more requirements of the temporal logic specifications. The robustness represents how well a demonstration satisfies the given specification. That is, the robustness value is used to assess quality of the demonstration with respect to the specification.

Next, at 406, the method 400 includes for each demonstration, assigning rewards for each state of demonstration based on robustness. As used herein, a demonstration good if the sequence of state-action pairs in the demonstration satisfies all STL requirements. That is, every state or state-action pair of the demonstration does not violate any specification.

Based on this reasoning, the reward is assigned to every state in the demonstration, while other states are assigned a reward of zero. Thus, the reward at each step guides the robot towards the goal along the demonstrated path. The good demonstrations will have strictly non-negative robustness value and hence positive rewards.

As used herein, a "bad" demonstration is one which does not satisfy any of the hard STL requirements $\Phi_H$. The demonstration may be imperfect, incomplete or both. At least one state-action pair in the demonstration fails to satisfy any of hard STL requirements. Instead of assigning rewards to each state of the demonstration, the reward is only assigned to the states or state-action pairs violating the specifications, while other states are assigned a reward of zero. A bad demonstration will have non-positive robustness value and hence negative reward.

Next, at 408, the method 400 includes determining a reward for each demonstration based on rewards in each state. Once the states in each demonstration have been assigned rewards, the next objective is to rank the demonstrations and combine all the rewards from the demonstrations into a cumulative reward that the learner (or robot) will use for finding the desired policy.

Next, at 410, the method 400 includes sorting all demonstrations to rank the demonstrations based on the reward for each demonstration.

Next, at 412, the method 400 includes inferring reward for the robot based on reward and rank for each demonstration. Due to robustness and its use in reward inferences, it is important to note that "better" the demonstration, higher the reward. In other words, the rewards are non-decreasing as we move from bad demonstrations to good demonstrations. Hence good demonstrations will strictly have higher reward values and are ranked higher than bad demonstrations The method 400 then returns.

Referring back to 306, upon determining candidate rewards, the method 300 proceeds to 308. At 308, the method 300 includes determining candidate policies based on the candidate rewards. In order to learn a policy from the inferred rewards, any of the existing model-free RL algorithms may be used with two modifications to the algorithm during the training step:—(1) reward observation step: during each step of an episode, we record the partial policy of the agent and evaluate it with all the hard specifications. The sum of the robustness values of the partial policy for each hard specification is added to the observed reward. This behaves like potential-based reward shaping, thereby preserving optimality. In the case when a close-to-optimal demonstration is ranked higher than another better demonstration, the algorithm also takes this into account and compensates for the mis-ranking in this step. (2) episode termination step/condition: the episode is terminated when, either the goals are reached or the partial policy violates any hard specification. These two modifications lead to faster and safer learning/exploration. This is especially helpful when agents interact with the environment to learn and the cost of learning unsafe states/behaviors is high (e.g., the robot can get damaged, or may harm humans).

Next, at 310, the method 300 includes verifying candidate policies based on one or more requirements of temporal logic. Once rewards are learned, verification-in-the-loop is used in conjunction with Reinforcement Learning on the rewards to ensure that the learned robots' behaviors meet the formal task specifications. This leads to guarantees in safety and performance, and hence very well-suited for safety and time-critical applications.

The rewards inferred from method 400, which is now referred to as feed-forward reward $R_{ff}$ are used to learn the Q-values on a map $E_{test}$ that could be the same as train map or an unseen map of similar size. This $R_{ff}$ is used as a reference/initialization on the new map, hence the requirement that the maps be of similar sizes. Next, a feedback reward ($R_{fb}$ is initially a copy of $R_{ff}$) gets updated during each reward observation step as described earlier. Once the Q-values are learned, the method returns a policy from the start state and ending at the desired goal state.

Accordingly, once it is determined that the policy satisfies the requirement of temporal logic (the answer at 312 is YES), the final policy is stored. Otherwise, the method 300 proceeds to 314 to update rewards, until the final policy is determined.

Figure 5:
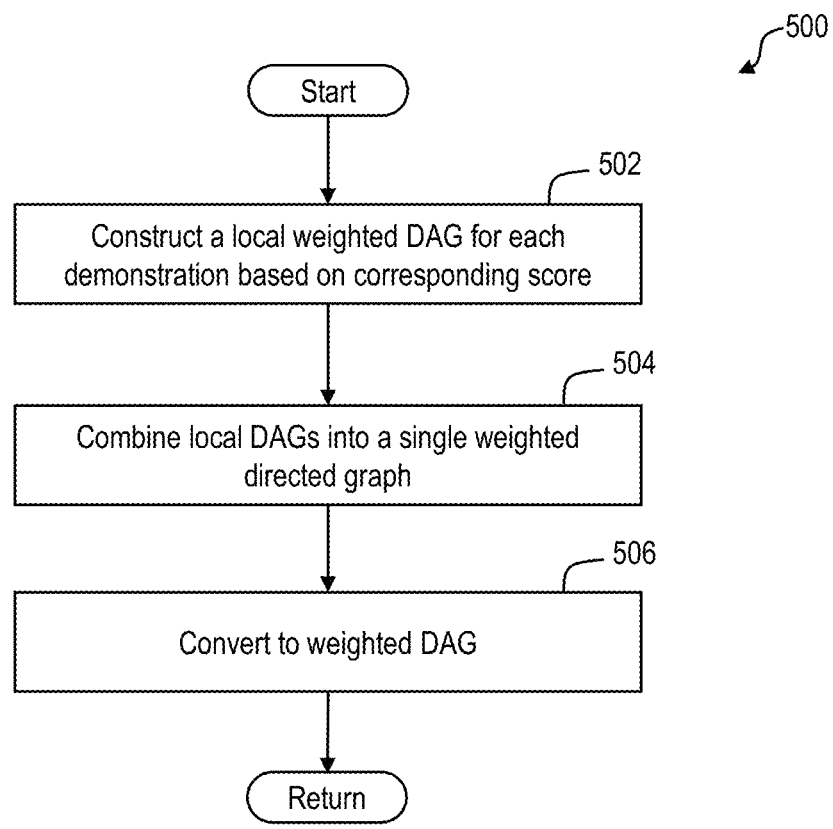
FIG. 5 depicts a flow chart illustrating an example method for automatically generating task descriptions corresponding to demonstrations, according to an embodiment of the disclosure.

Turning next to FIG. 5, it shows an example method 500 for automatically determining DAG. Details of automatically determining DAG are also described with respect to FIGS. 24-30 described below with respect to Example 3. A directed acyclic graph (DAG) is an ordered pair G=(V, E) where V is a set of elements called vertices or nodes and E is a set of ordered pairs of vertices called edges or arcs, which are directed from one vertex to another. An edge e=(u, v) is directed from vertex u to vertex v. A path u ⤳ v in G is a set of vertices starting from u and ending at v by following the directed edges from u. Each vertex v∈V is associated with a real number-weight of the vertex, represented by w(v). Similarly, each edge (u, v)∈E is associated with a real number-weight of the edge and is represented by w(u, v). Each node of a DAG G is representation of a specification. The final inferred DAG is used with the LfD-STL framework to learn rewards and perform RL.

The method 500 begins at 502. At 502, the method 500 comprises constructing a local weighted-DAG for each demonstration based on its corresponding score. Each demonstration $\xi \in \Xi$ is associated with a vector of ratings $\rho_\xi = [\rho_1, \ldots, \rho_{|\phi|}]^T$. Initially, the evaluations are sorted in non-increasing order, breaking ties arbitrarily. This creates a partial ordering based on the performance of the demonstrations regarding each specification and hence, a DAG is used to represent this ordering.

Consider 4 specifications $\varphi_i$; $i \in \{1, 2, 3, 4\}$. Let a demonstration, say $\xi \in \Xi$ have evaluations $\rho_\xi = [\rho_1, \rho_2, \rho_3, \rho_4]$ and without loss of generality, let them already be sorted in non-increasing values, i.e., $\rho_i \geq \rho_j$; $\forall i < j$. As discussed above, each node of the DAG is a representation of each specification of Φ. An edge between two nodes $\varphi_i$ and $\varphi_j$ is created when the difference between their corresponding evaluations is greater than a small threshold value. This edge represents the relative rating or performance difference between the specifications and creates a partial ordering indicating the same. The threshold ϵ acts as a high-pass filter and can be tuned depending on the complexity of the environment, and the intuition is that demonstrations exhibiting similar behaviors will have similar evaluations for the specifications, and hence an edge is created if the evaluations differ greatly. This is needed when combining 2 robustness values of say, 1.0 and 0.999, which are numerically different, but have similar performance. Without this filter, an edge with a very small weight would be created even for similar behaviors. This process is repeated for each node in the DAG and the resultant DAG will have at most n(n−1)/2 edges, where n is the number of specifications in Φ. This number is derived from the fact that the maximum number of edges in the DAG occur when the DAG is fully connected. The local graph is acyclic, because the nodes are sorted by their respective evaluations in a non-increasing order and hence edges with negative weights will not be added thereby eliminating any bi-directional edges. The DAG for a demonstration imposes a partial order over all specifications. For any 2 specifications $\varphi_i$ and $\varphi_j$, $\varphi_i \geq \varphi_j$ if $\varphi_i \geq \varphi_j$ and so an edge is created from $\varphi_i$ to $\varphi_j$ with weight $\rho_{oi} - \rho_{oj}$.

Next, at 504, the method 500 includes combining the local graphs into a single weighted directed graph, which is not necessarily acyclic as it can contain bi-directional edges between nodes.

Next, at 506, the method 500 comprises converting the resultant graph into a weighted DAG. In order to reduce the intermediate graph (obtained at 504) to a global DAG, the edges are systematically eliminated by first computing the difference between the outgoing and incoming edge and then checking if it is above a certain threshold to add an edge in the direction of positive difference (note that if the difference is negative, the edge can be simply reversed). In other words, for any 2 nodes, u and v, if (w(u, v)-w(v, u))>ϵ, then e(u, v) is retained with new weight w(u, v)-w(v, u), while e(v, u) is removed or discarded since it gets absorbed by the retained edge. The threshold ϵ again acts as a high-pass filter. As in the case of bi-directional edges, one of the edges will be "consumed" by the other or both will be discarded if they are similar. Thus all cycles/loops are eliminated resulting in a weighted DAG and can be directly used to compute rewards for reinforcement learning tasks as shown in the LfD-temporal logic framework.

In this way, a novel methodology is provided to capture the performance of demonstrator behaviors in terms of graphs to provide intuitive representations about the demonstrations shown to the robot. The inferred graphs could be directly applied to the LfD-temporal logic framework to extract rewards and control policies via RL.

Additionally, to show that the graphs are indeed explainable, the inventors conducted a user study and provided evidence via statistical analysis that the human-based ratings were similar to the method described herein, which also performed better than clustering algorithms. The experimental data is shown at FIGS. 29A to 32D. Further, the method was able to infer DAGs with a limited number of even imperfect demonstrations.

Figure 6:
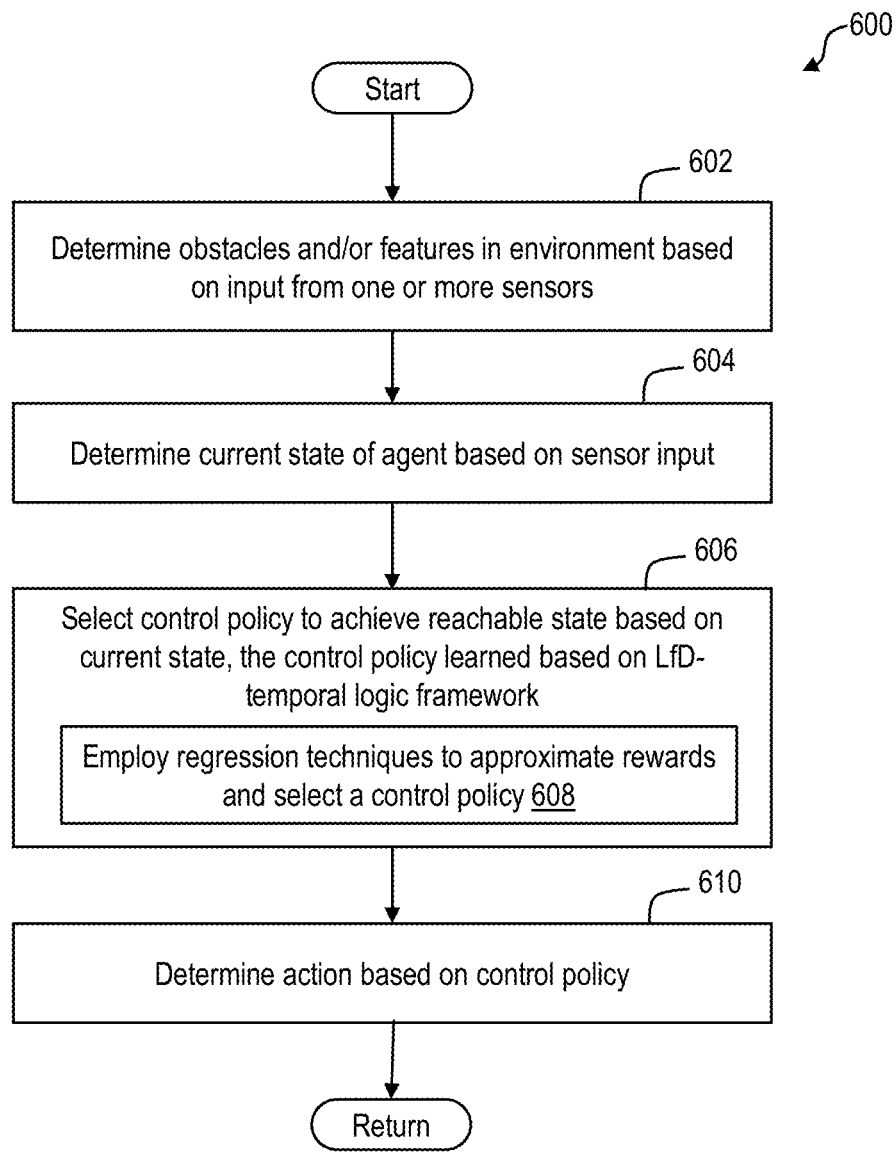
FIG. 6 depicts a flow chart illustrating an example method for generating an action based on learnt policies, according to an embodiment of the disclosure.

FIG. 6 shows an example method 600 for operating an intelligent system, such as an agent 102 at FIG. 1, which may be robotic agent, a cyber-physical system, etc. in an environment, such as environment 130. In particular, the method 600 may be implemented to determine a reachable set of states from a given observed state of the intelligent system.

At 602, the method 600 includes evaluating the environment of the intelligent system based on input from one or more sensors, such as sensors 104.

Next, at 604, the method 600 includes determining a current state of the intelligent system with respect to the environment.

Next, at 606, the method 600 includes selecting a control policy among a plurality of policies to achieve a reachable state, wherein the control policy is learnt according to a LfD-temporal logic frame work described herein at FIGS. 3 and 4.

In one example, regression techniques, such as Gaussian Processes, neural networks (NN) such as feed-forward deep NN, convolutional NN, etc., may be implemented that take as input, the features of a state or state-action pair and output a single/scalar reward. In one example, for continuous actions, in order to compute the reachable set from a given observed state with bounded time and actions, each observed state may be modelled using a (multi-variate) Gaussian distribution and samples may be generated. These samples correspond to the reachable set and the probability of each sample belonging to that distribution may be computed, which gives us the transition probabilities. Specifically, instead of using each of the tuples in the form of (state, reward) or (state, action, reward) in their raw form as training data, the tuples may be represented as samples of (multi-variate) Gaussian distribution with mean s or (s,a) and having a scaled identity covariance matrix representing the noise in the observations. Then, k samples may be generated from the distribution of each observed state to represent the reachable set. For each of the k samples, we can estimate the probability of that sample belonging to the distribution of the observed state, which is the transition function that can be used to assign rewards as described earlier, and infer a control policy.

Next, upon selecting a control policy, at 610, the method 600 includes determining the action to be performed based on the control policy. For example, a control module may convert the desired actions into electrical signals, which are then provided to one or more actuators (e.g., actuators 110) of the intelligent system to perform the desired action.

In one embodiment, provided herein are is a system, comprising: one or more sensors configured to acquire environmental data of an environment interacting with the system; one or more processors; a computer-readable medium storing executable instructions that, when executed, cause the system to perform operations comprising: evaluate a current state of the system according to the environmental data from the one or more sensors; and determine an action to be performed by the system based on the current state according to a control policy; wherein the control policy is learned based on inferred rewards from a plurality of demonstrations; and wherein the plurality of demonstrations are evaluated and ranked based on a robustness value of each demonstration using a set of specifications in a formal language.

In one example of the system, the formal language is selected from the group consisting of is selected from the group consisting of a temporal logic, a STL, a LTL, and a CTL.

In another example of the system, which optionally includes the first example, the inferred rewards are based on uncertainties in the environment; and wherein the inferred reward increases with increase in uncertainty.

In another embodiment, provided herein is a system for reinforcement learning, the system comprising: one or more processors; a computer-readable medium storing executable instructions that, when executed, cause the system to perform operations comprising: receive a set of demonstrations, the set of demonstrations obtained via interaction of an agent with an environment determined according to sensor input from one or more sensors of the agent; receive a set of specifications, the set of specifications providing descriptions of one or more tasks and/or one or more objectives; convert the set of specifications into a formal language; evaluate the set of demonstrations based on the set of specifications in formal language; generate a robustness value for each demonstration in the set of demonstrations based on the evaluation; infer rewards for each demonstration based on the robustness value; learn a control policy based on the inferred rewards; and provide one or more control signals to one or more actuators of the agent based on the control policy.

In one example of the system, the formal language is a temporal logic.

In a second example of the system, which optionally incudes the first example, the temporal logic is selected from the group consisting of Signal Temporal Logic (STL), Linear Temporal Logic (LTL), and Computation Tree Logic (CTL).

In a third example of the system, which optionally includes one or more of the first and second examples, the computer-readable medium stores further instructions that when executed cause the system to: verify the learned control policy based on the set of specifications to determine a final policy.

In a fourth example of the system, which optionally includes one or more of the first through third examples, the computer-readable medium stores further instructions that when executed cause the system to: for each demonstration comprising a set of state and action pairs, generate a state reward corresponding to each state; and generate a candidate reward for each demonstration based on the state reward for each state in the set of states for each demonstration.

In a fifth example of the system, which optionally includes one or more of the first through fourth examples, inferring rewards for each demonstration comprises ranking each demonstration based on the robustness value, and determining a learner reward for the agent based on the ranks and corresponding candidate rewards for each demonstration.

In a sixth example of the system, which optionally includes one or more of the first through fifth examples, the control policy is determined based on a reinforcement learning algorithm.

In a seventh example of the system, which optionally includes one or more of the first through sixth examples, the set of specifications are provided in natural language.

In an eighth example of the system, which optionally includes one or more of the first through seventh examples, the agent is selected from the group consisting of a cyber-physical system, a robotic system, an autonomous vehicle, an insulin delivery system, and a drone.

In a ninth example of the system, which optionally includes one or more of the first through eighth examples, each specification in the set of specifications is represented as a directed acyclic graph (DAG).

In another embodiment, provided herein is a method for performing reinforcement learning, the method comprising: receiving a set of demonstrations, the set of demonstrations obtained via interaction of an agent with an environment; receiving a set of specifications, the set of specifications providing descriptions of one or more tasks and/or one or more objectives; converting the set of specifications into a formal language; evaluating the set of demonstrations based on the set of specifications in formal language; generating a robustness value for each demonstration in the set of demonstrations based on the evaluation; inferring rewards for each demonstration based on the robustness value; learning a control policy based on the inferred rewards; and storing the control policy.

In a first example of the method, the formal language is a temporal logic.

In a second example of the method, which optionally includes the first example, the temporal logic is selected from the group consisting of Signal Temporal Logic (STL), Linear Temporal Logic (LTL), and Computation Tree Logic (CTL).

In a third example, which optionally includes one or more of the first and the second examples, the method further comprises, for each demonstration comprising a set of state and action pairs, generating a state reward corresponding to each state.

In a fourth example of the method, which optionally includes one or more of the first through third methods, the method further comprising, generating a candidate reward for each demonstration based on the state reward for each state in the set of states.

In a fifth example of the method, which optionally includes one or more of the first through fourth methods, inferring rewards for each demonstration comprises ranking each demonstration based on the robustness value, and determining a learner reward for the agent based on the ranks and corresponding candidate rewards for each demonstration.

In a sixth example of the method, which optionally includes one or more of the first through fifth methods, the agent is selected from the group consisting of a cyber-physical system, a robotic system, an autonomous vehicle, an insulin delivery system, and a drone.

EXAMPLES

The following examples are provided to better illustrate the claimed invention and are not intended to be interpreted as limiting the scope of the invention. To the extent that specific materials or steps are mentioned, it is merely for purposes of illustration and is not intended to limit the invention. One skilled in the art may develop equivalent means or reactants without the exercise of inventive capacity and without departing from the scope of the invention.

An important problem to address when designing and training RL agents is the design of state-based reward functions as a means to incorporate knowledge of the goal and the environment model in training an RL agent. As reward functions are mostly handcrafted and tuned, poorly designed reward functions can lead to the RL algorithm learning a policy that produces undesirable or unsafe behaviors or simply to a task that remains incomplete. The key insight of the systems and methods described herein is that the use of even partial STL (signal temporal logic) specifications can help in a mechanism to automatically evaluate and rank demonstrations, leading to learning robust control policies and inferring rewards to be used in a model-free RL setting. In this way, a framework for a flexible structured reward function formulation is provided. In various embodiments, a framework for LfD using STL specifications to infer rewards without the necessity for optimal or perfect demonstrations is provided. In other words, the method described herein can infer non-Markovian rewards even from imperfect or sub-optimal demonstrations and are used by the robot to find a policy using off-the-shelf model-free RL algorithms with slight modifications. Further, the method can also learn from only a small number of demonstrations which is practical for non-expert users and also for large environments that result in sparse rewards, while not introducing additional hyperparameters for the reward inference procedure. Furthermore, the systems and methods described herein provide a solution to the problem of achieving multiple sequential goals/objectives by combining STL specifications with Q-Learning. In Example 1 described below, using a discrete-world setting, it is shown that effective control policies can be learned such that they satisfy the defined safety requirements while also trying to imitate the user preferences.

Example 1: Learning from Demonstrations Using Signal Temporal Logic

As discussed above "environment" E refers to a tuple E=(S, A) consisting of the set of all possible states S defined over $\mathbb{R}^n$ and actions A, where n is the dimension of the real space. A goal or objective in E is an element of S. Further, "demonstration" (or a policy or trace) refers to a finite sequence of state-action pairs. Formally, a demonstration d of length L∈N is given as d={(s1, a1), (s2, a2), . . . , (sL, aL)}, where si∈S and ai∈A. That is, d is an element of $(S \times A)^L$. Demonstration is alternatively referred to as "policy" or "trace" herein.

As used herein, the term "Signal Temporal Logic" (STL) refers to a real-time logic, generally interpreted over a dense-time domain for signals that take values in a continuous metric space (such as $\mathbb{R}^m$). For a policy or demonstration, the basic primitive in STL is a signal predicate u that is a formula of the form f(x(t))>0, where x(t) is the tuple (state, action) of the demonstration x at time t, and f is a function from the signal domain D=(S×A) to $\mathbb{R}$. STL formulas are then defined recursively using Boolean combinations of sub-formulas, or by applying an interval-restricted temporal operator to a sub-formula. The syntax of STL is formally defined as follows: $\varphi ::= \mu | \neg \varphi | \varphi \wedge \varphi | G_I \varphi | F_I \varphi | U_I \varphi$. Here, I=[a, b] denotes an arbitrary time-interval, where a, b ∈ $\mathbb{R}^{\geq 0}$. The semantics of STL are defined over a discrete-time signal x defined over some time-domain T. The Boolean satisfaction of a signal predicate is simply True (T) if the predicate is satisfied and False ($\not{V}$) if it is not, the semantics for the propositional logic operators ¬, ∧ (and thus ∨, →) follow the obvious semantics. The temporal operators model the following behavior:

At any time t, $G_I(\varphi)$ says that must hold for all samples in t+I.

At any time t, $F_I(\varphi)$ says that must hold at least once for samples in t+I.

At any time t, $U_I \Psi$ says that $\Psi$ must hold at time t' in t+I, and in [t, t'), φ must hold.

A signal satisfies an STL formula φ if it is satisfied at time t=0. The quantitative semantics of STL are defined in table 1 below. Intuitively, they represent the numerical distance of "how far" a signal is away from the signal predicate. For a given requirement φ, a demonstration or policy d that satisfies it is represented as $d \mathcal{R} \varphi$ and one that doesn't is represented as $d \not{\mathcal{R}} \varphi$.

Consider a 6×6 grid environment and the policies shown in broken arrow and solid arrow (FIG. 7A). Each cell in the grid is represented a tuple (x, y) indicating its coordinates with the origin at top-left (0, 0). The possible actions in each cell are {U, D, L, R}. The grey hatched cells are regions to be avoided and a policy is required to start at blue cell and end at brown. Consider the specifications: φ1: = $F_{[0,9]}(X(t)=(0, 4))$ and φ2: =$G_{[0,9]}(dist_{red}(X(t)) \geq 1)$ where $dist_{red}$ is the taxi-cab distance between a cell and its nearest grey hatched cell. For the broken arrow policy, π={((4, 0), R); ((4, 1), R); ((4, 2), U); ((3, 2), U); ((2, 2), U); ((1, 2), U); ((0, 2), R); ((0, 3), R); ((0, 4), U)}. Here the signal x is considered to represent only the states of π. We see that φ1 is satisfied since the brown cell (0, 4) occurs in the policy within 9 time-steps. We compute the $dist_{red}$ and we see that the policy intersects with grey hatched cells and hence φ2 is not satisfied since there exists a time-step at which the cells coincide. In a similar way, we can see that the yellow policy satisfies both requirements since the goal state occurs in its policy and its $dist_{red}$ is always greater than 0.

There are two classes of temporal logic requirements: (i) hard requirements $\Phi_H$ and (ii) soft requirements $\Phi_S$. Hard requirements are the certain properties of a system that are required to be invariant, i.e., the system must obey the rules or operate within its constraints at all times. Examples of this are: a robot should always operate/remain within its operational workspace, the joint velocities of a robot must always be within a specific range [$v_a$, vb], etc. These properties can be interpreted as safety requirements for the system and they typically have the form: G(φ). Such requirements always need to be satisfied by a system before being able to satisfy the soft requirements. Soft requirements typically correspond to the optimality of a system such as performance, efficiency, etc. These specifications may also be competing with each other and might require some trade-offs.

Methodology

In one example method, rewards from user demonstrations and STL specifications are inferred. Given a transition system M\{R, T} with unknown rewards and transition probabilities, a finite set of high-level specifications in STL $\Phi=\Phi_H \cup \Phi_s$ and a finite dataset of human demonstrations D={d1, d2, . . . , $d_m$} in an environment E, where each demonstration is defined as in Definition 2, the goal is to infer a reward function R for M such that the resulting robot policy π obtained by a model-free RL algorithm, satisfies all the requirements of Φ. The hard requirements are given by $\Phi_H$={φ1, φ2, . . . , $φ_p$} and the soft requirements are given by $\Phi_s$={φp+1, φp+2, . . . , $φ_q$}.

Framework

A framework for learning reward functions from demonstrations and STL specifications is shown at FIG. 8. A user defines a set of specifications or system requirements which are arranged in a directed acyclic graph structure, explained below with respect to reward inference. The user also provides a demonstration-set D, which is then utilized by algorithms described below, to infer a reward function R for the robot. The problem is then solved through a feedback loop (FIG. 8) on the inferred reward R using a model-free RL algorithm to obtain a robot policy that satisfies the user requirements. In one example, the verification may be an empirical verification. Using the STL representations, complex tasks involving multiple goals, which cannot be easily encoded or represented in traditional IRL may be expressed. One or more assumptions may be used, which may include:

(1) An assumption that the world and agent consist of discrete states and actions. In one example, for continuous state systems, an abstraction that groups several continuous states into abstract may be performed.
(2) Another assumption may include that there exists a feasible path to reach the goals from the initial state,
(3) Another assumption may include that for testing on an unseen map, the only requirement may be that the map is of the same size as the one on which the robot was trained. Further, the states of a policy are considered as signal and may discard the actions associated with those states when evaluating a specification.

Reward Inference

DAG Representation. A Directed Acyclic Graph (DAG) is an ordered pair G=(V, E) where V is a set of elements called vertices or nodes and E is a set of ordered pairs of vertices called edges or arcs, which are directed from one vertex to another. An edge e=(u, v) is directed from vertex u to vertex v. A path p(u, v) in G is a set of vertices starting from u and ending at v by following the directed edges from u. The ancestors of a vertex v is the set of all vertices in G that have a path to v. Formally, ancestor (v)={u|p(u, v), u∈V}. The requirements in $\Phi_H$ and $\Phi_S$ are each represented as a node in a DAG G to explicitly capture dependencies between requirements: we need requirements in $\Phi_H$ to be satisfied before the requirements in $\Phi S$ are satisfied. Thus, edges in the DAG capture dependencies and user preferences among requirements. The weight on each node in G is computed using Equation 1 and an example is shown in FIG. 7B

$$w(\varphi)=|\phi|-|ancestor(\varphi)| \qquad (1)$$

where $\Phi=\Phi_H \cup \Phi_S$ is the set of all specifications. This equation represents the relative importance of each specification based on the number of dependencies that need to be satisfied. These computed weights are passed through a softmax function to give higher importance to "harder" specifications. For an STL specification $\varphi_i \in \Phi$ and a demonstration dj∈ D defined as above the value $rob^j_i=\rho(\varphi_i, dj, t)$ represents how well the demonstration satisfies the given specification, i.e., the robustness value is used to assess quality of the demonstration w.r.t the specification. There are two reward inference rules based on the quality of a demonstration. At a given time t and for every demonstration dj∈ D, the final reward is computed as in Equation 2, where q is the total number of specifications in Φ of which the first p are ΦH and the remaining q−p are ΦS. The reward $r_{dj} \in R$ where R: D→R, i.e., it maps a demonstration to a real number.

$$rd_j = \sum_{i=1}^{q} w(\varphi i) \cdot rob_i^j \qquad (2)$$

$$r(s) = \begin{cases} rd_j, & \text{if } s \in s_{bad} \\ 0, & \text{otherwise} \end{cases} \qquad (3)$$

In addition, the robustness values can be bounded to specific ranges depending on the STL formula, such as using tank or piece-wise linear functions. This makes it appropriate to linearly combine robustness values of specifications since they are on similar scales. For a demonstration, the rewards in each state must be assigned a numerical value based on rd., described in the following sections. The rewards for dj are {r(s1), r(s2), . . . , r(sL)} where r(s) is the reward corresponding to each state s∈ dj.

Specification-Ranked Demonstration

As used herein, a demonstration good if the sequence of state-action pairs in the demonstration satisfies all STL requirements. Every state or state-action pair of the demonstration does not violate any specification.

Based on this reasoning, the reward is assigned to every state in the demonstration, while other states are assigned a reward of zero. Let a demonstration dj of length L have a reward value $r_{dj}$, computed using Equation 2. The reward assignment capturing the non-Markovian or cumulative nature is given as:

$$r(s_l) = \frac{1}{L} \cdot rd_j$$

where l=1, 2, . . . . L; $s_l \in dj$. This essentially captures the non-Markovian nature of the demonstration since the entire trajectory is evaluated, and based on the above equation, the reward at each step guides the robot towards the goal along the demonstrated path. The good demonstrations will have strictly non-negative robustness value and hence positive rewards.

As used herein, a "bad" demonstration is one which does not satisfy any of the hard STL requirements $\Phi_H$. The demonstration may be imperfect, incomplete or both. At least one state-action pair in the demonstration fails to satisfy any of hard STL requirements. Mathematically, given a hard requirement $\varphi$ of the form $G(\Psi)$, a demonstration is bad if $\exists j: s.t.(s_j, a_j) \not\models \psi$.

Logically, instead of assigning rewards to each state of the demonstration, the reward is only assigned to the states or state-action pairs violating the specifications, while other states are assigned a reward of zero. A bad demonstration will have non-positive robustness value and hence negative reward. Consider a demonstration dj of length L that has reward value $rd_j$, computed using Equation 2. Let $s_{bad} \in dj$ be the states at which a violation of $\varphi$ occurs while $s_{good}$ be the states that do not violate the specification (i.e., $s_{bad}=\{s_j | (s_j, a_j) \not\approx \psi\}$), then the reward assignment is as shown in Equation 3. Intuitively, it penalizes the bad states while ignoring the others since the good states may be part of another demonstration or the learned robot policy that satisfies all requirements. Learner Reward Once the states in each demonstration have been assigned rewards, the next objective is to rank the demonstrations and combine all the rewards from the demonstrations into a cumulative reward that the learner (or robot) will use for finding the desired policy. The demonstrations are sorted by their robustness values to obtain rankings. The learner reward is initialized to zero for all the states in the environment. The resulting reward for the robot is given by $$R = \sum_{j=1}^{m} \text{rank}(d_j) \cdot r_{d_j}$$

and then normalized, where m is the number of demonstrations. This equation affects only the states that appear in the demonstrations and the intuition here is that preference is given to higher-ranked demonstrations. By the definition of robustness and its use in reward inferences, it is important to note that "better" the demonstration, higher the reward. In other words, the rewards are non-decreasing as we move from bad demonstrations to good demonstrations. Hence good demonstrations will strictly have higher reward values and are ranked higher than bad demonstrations. The demonstrations are provided by users on a known map Etrain.

Learning Policies from Inferred Rewards

In order to learn a policy from the inferred rewards, we can use any of the existing model-free RL algorithms with just 2 modifications to the algorithm during the training step:—(1) reward observation step: during each step of an episode, we record the partial policy of the agent and evaluate it with all the hard specifications PH. The sum of the robustness values of the partial policy for each hard specification is added to the observed reward. This behaves like potential-based reward shaping, thereby preserving optimality. In the case when a close-to-optimal demonstration is ranked higher than another better demonstration, the algorithm also takes this into account and compensates for the mis-ranking in this step. (2) episode termination step/condition: we terminate the episode when, either the goals are reached or the partial policy violates any hard specification. These two modifications lead to faster and safer learning/exploration. This is especially helpful when agents interact with the environment to learn and the cost of learning unsafe states/behaviors is high (e.g., the robot can get damaged, or may harm humans). The effectiveness this approach is shown using standard Q-Learning, which is referred to as $Q_{stl}$ and extend its use for multiple sequential objective MDP. This new $Q_{stl}$ algorithm incorporates RL with verification-in-the-loop method for safer exploration and learning from imperfect demonstrations. The rewards inferred from algorithm 1, which we now refer to as feed-forward reward $R_{ff}$ are used to learn the Q-values on a map $E_{test}$ that could be the same as train map or an unseen map of similar size. This $R_{ff}$ is used as a reference/initialization on the new map, hence the requirement that the maps be of similar sizes. We now introduce the notion of feedback reward $R_{fb}$ that the algorithm uses during execution. $R_{fb}$ is initially a copy of $R_{ff}$ and gets updated during each reward observation step of the algorithm as described earlier. Once the Q-values are learned, the algorithm returns a policy from the start state and ending at the desired goal state. We have described a Q-Learning procedure that incorporates STL specifications in learning the Q-values and obtaining a policy, given a start and end state. In order to learn a policy for multiple objectives, consider a set of goal states Goals={g1, g2, . . . , gk} where k is the number of objectives or goals. Some specifications can require the robot to achieve the goals in a particular sequential order while others may require the robot to achieve goals without any preference to order. In the case of arbitrary ordering, the number of ways to achieve this is k!, hence all the permutations of the goals are stored in a set. For each permutation or ordering[3] of the goals <g1, g2, . . . , gk>, a policy is extracted that follows the order:

$$\pi_p : \text{start} \xrightarrow{Q_{stl}} g_1 \xrightarrow{Q_{stl}} g_2 \xrightarrow{Q_{stl}} \dots \xrightarrow{Q_{stl}} g_k.$$

Partial ordering helps reduce complexity. In the case of particular ordering, this step can be replaced by the desired order and the complexity reduces from k! to 1.

Each of the final concatenated policies $\pi_p$ is recorded and stored in a dataset represented by $\Pi$. At this stage, the policies in $\Pi$ all satisfy the hard requirements $\Phi_H$ and hence all are valid/feasible trajectories. Finally, the policy that results in maximum robustness w.r.t. the soft requirements $\Phi_S$ is chosen, which imitates the user preferences. The algorithms are detailed below.

EXPERIMENTS

Single-Goal Grid-World. A grid-world environment E consisting of a set of states S={start, goals, obstacles} is considered. The map sizes that used are: 5×5, 7×7 and 10×10; where the obstacles were assigned randomly. The distance metric used for this environment is Manhattan distance and the STL specifications for this task are:

Avoid obstacles at all times (hard requirement): $\varphi 1$: $G_{[0,T]}(d_{obs}[t] \geq 1)$, where T is the length of a demonstration and $d_{obs}$ is the minimum distance of robot from obstacles computed at each step t.

Eventually, the robot reaches the goal state (soft requirement): $\varphi 2: F_{[0,T]}(d_{goal}[t] < 1)$, where $d_{goal}$ is the distance of robot from goal computed at each step. $\varphi 2$ depends on $\varphi 1$.

Reach the goal as fast as possible (soft requirement): $\varphi 3: F_{[0,T]}(t \leq T_{goal})$, where $T_{goal}$ is the upper bound of time required to each the goal, which is computed by running breadth-first search algorithm from start to goal state, since the shortest policy must take at least $T_{goal}$ to reach the goal. $\varphi 3$ depends on both $\varphi 1$ and $\varphi 2$.

Figure 9A:
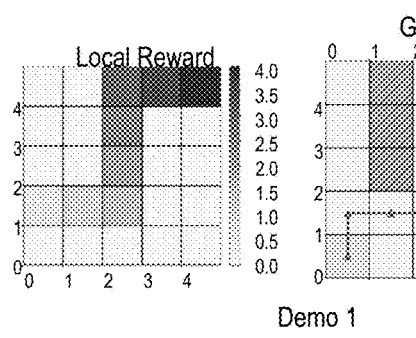
FIG. 9A shows learned rewards (left); and at right, shows the grid-world with start state (light grey), goal (dark grey), obstacles (grey hatched) and demonstration/policy (grey arrow), according to a demonstration.
Figure 9B:
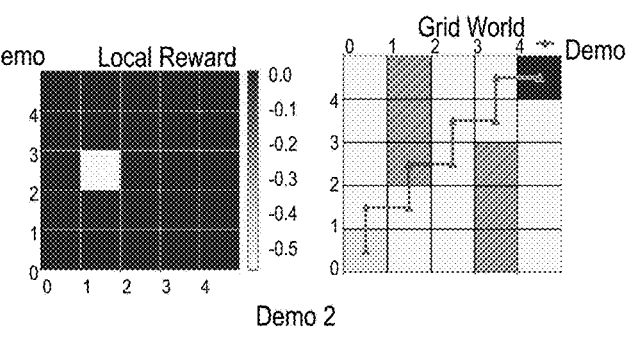
FIG. 9B shows learned rewards (left); and at right, shows the grid-world with start state (light grey), goal (dark grey), obstacles (grey hatched) and demonstration/policy (grey arrow), according to another demonstration.
Figure 9C:
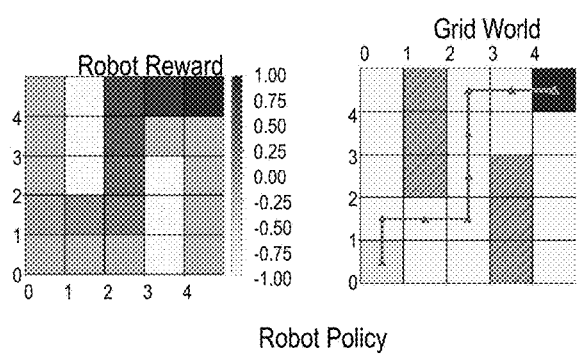
FIG. 9C shows learned rewards (left); and at right, shows the grid-world with start state (light grey), goal (dark grey), obstacles (grey hatched) and demonstration/policy (grey arrow), according to a robot policy.

STL specifications are defined and evaluated using a Matlab toolbox-Breach. A grid-world point-and-click game was created using PyGame package that showed the locations of start, obstacles and goals. The users provide demonstrations by clicking on their desired states with the task to reach the goal state from start without hitting any obstacles. For this map, m=2 demonstrations (1 good and 1 bad) were used from a single user. The demonstrations and resulting robot policy are shown in FIGS. 9A-9C. The blue heatmap figures represent the rewards learned from the demonstrations (darker represent higher rewards). Since hitting an obstacle (grey hatching) is penalized heavily by the hard requirement compared to other states, the rewards in the other safe states and goal state appear similar in value due to the scaling difference. For grid sizes 7×7 and 10×10, similar results were observed and each grid had m=4 demonstrations (2 good, 1 bad and 1 incomplete). The number of episodes used for training ranged from 3000 to 10000 depending on the complexity (grid size, number and locations of obstacles) of the grid-world. The discount factor γ was set to 0.99 and f-greedy strategy for actions was used with f=0.4. The learning rate used in the experiments is α=0.1.

Multi-Goal Grid-World. Experiments were conducted with a grid-world having k=2 goals. The specifications used are as follows:
1. Avoid obstacles at all times (hard requirement): $\varphi 1: G_{[0,T](d_{obs}[t] \geq 1)}$, where $d_{obs}$ is the minimum distance of robot from obstacles computed at time-step t.
2. Eventually, the robot reaches both goal states in any order (soft requirement): $\varphi 2: F_{[0,T](d_{goal1}[t]<1)} \wedge F_{[0,T](d_{goal2}[t]<1)}$. $\varphi 2$ depends on $\varphi 1$.
3. Reach the goals as fast as possible (soft requirement): similar to the single-goal $\varphi 3: F_{[0,T]}(t \leq T_{goal})$ grid-world experiment. $\varphi 3$ depends on both $\varphi 1$ and $\varphi 2$.

For the 5×5 grid, a total of m=3 demonstrations were provided (2 good and 1 bad) and for the 7×7 grid, only m=2 good, but sub-optimal demonstrations were provided using similar hyperparameter settings are indicated earlier. Further details are available in the appendix.

OpenAI Gym.

Figure 10A:
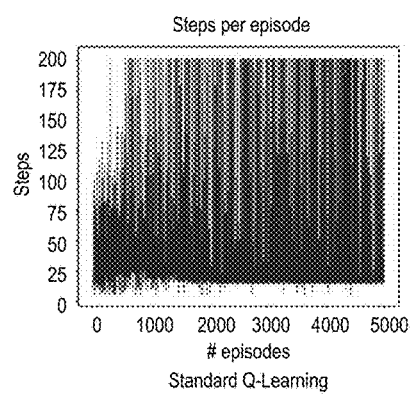
FIGS. 10A, 10B, and 10C depict graphs showing comparisons of LfD+STL with hand-crafted rewards+Q-Learning for OpenAI Gym environments.
Figure 10B:
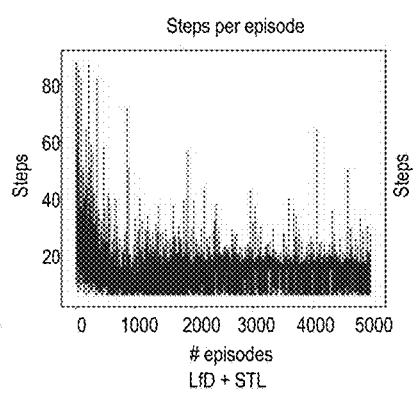
Figure 10C:
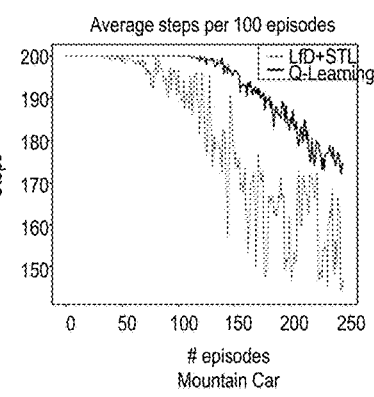

An example integrated method for robot learning that integrates STL specification and LfD was tested on the OpenAI Gym Frozenlake environment with both 4×4 and 8×8 grid sizes as well as on Mountain Car. The integrated method was compared to standard Q-Learning with hand-crafted rewards, based on the number of exploration steps performed by the algorithm in each training episode:—(a) FrozenLake: m=4 demonstrations were generated by solving the environment using Q-Learning with different hyperparameters to generate different policies. The FrozenLake grid was modified to relocate the holes, while the goal location remained the same. The specifications used are similar to the single-goal grid-world experiment and are direct representations of the problem statement. Comparisons are shown in FIGS. 10A and 10B, and we see that the integrated method is able to narrow-down the search exploration space under the same hyperparameter settings. (b) Mountain Car: The continuous observation space was abstracted into 50×50 grid sizes and generated m=2 optimal demonstrations based on a Q-Learning algorithm with preset hyperparameters. In this case, one requirement was based on the problem definition: $\varphi = F_{[0,T]}(d_{flag}[t] \leq 0)$, where $d_{flag}$ is the Manhattan distance between the car and the goal flag positions at time t. The comparison with Q-Learning for hand-crafted rewards is summarized in FIG. 10C. Though there is more variance in the average steps involving the integrated method, we observe that the worst-case average of algorithm is still better than the best-case average of standard RL. Further details about the demonstration and policy are described below.

Figure 11A:
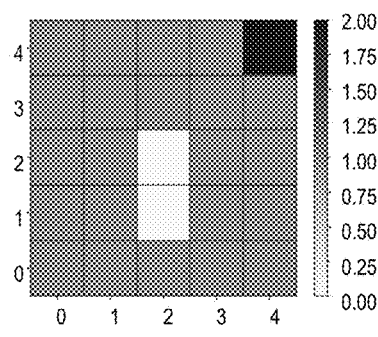
FIGS. 11A, 11B, and 11C show comparison of rewards with ground truth and state-of-the-art MCE-IRL.
Figure 11B:
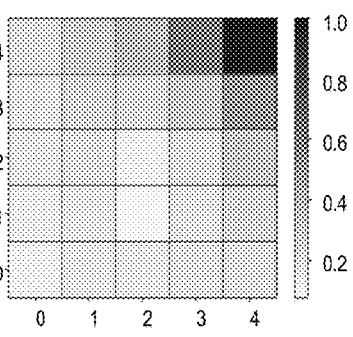
Figure 11C:
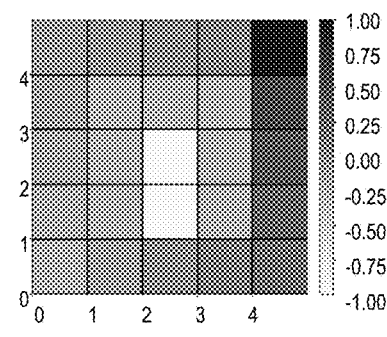

It can be seen that the reward and policy learned by the robot is able to satisfy all the STL requirements from the given initial condition without having the user to explicitly specify/design rewards for the robot and without having to indicate any low-level controls such as robot actions. Because the algorithm automatically performs ranking of demonstrations, it can be interpreted as preference-based learning since it prefers to follow a demonstration that has "higher" satisfaction of the specifications. Further, the integrated method for robot learning uses fewer demonstrations and can learn from sub-optimal or imperfect demonstrations. A technical advantage is that additional hyperparameters are not introduced, and hence any hyperparameter tuning depends on the RL algorithm. The integrated method for robot learning was compared with Maximum Causal Entropy IRL (MCE-IRL) on the grid-world and Mountain Car tasks. In the grid-world environment, the ground truth for a 5×5 grid-world is provided in which the goal is at the top-right corner with reward +2 and the initial state is at the bottom-left. There are 2 states to avoid with reward 0 and every other state where the agent can traverse has a reward of +1 (FIG. 11A). The actual values of the reward are not important since they can be easily interpreted/represented as potential based reward functions which preserve policy optimality. MCE-IRL requires at least 60 optimal demonstrations to recover an approximate reward, whereas the integrated method can recover a more accurate reward with just 3 (2 good and 1 bad) demonstrations (see FIGS. 11A-11C). Similar results were obtained with other grid-sizes used in the earlier experiments. For Mountain Car with 50×50 discretization, both MCE-IRL and the integrated method obtained very similar rewards, with the former requiring at least 10 optimal demonstrations, while the latter used just 2 demonstrations. The ground truth for Mountain Car is provided by the environment itself. Note that the demonstrations provided for MCE-IRL are all optimal while the demonstrations for the integrated method are mixed (i.e., some good and some bad/sub-optimal). In addition, MCE-IRL does not learn an accurate reward compared to the ground truth. We also noticed that MCE-IRL does not perform well when there are multiple avoid regions/obstacles scattered over the map (e.g., Frozenlake) and in such cases, MCE-IRL requires significantly more demonstrations. On smaller environments, the computation time for inferring rewards is similar for both algorithms. However, as the environment size increases, the computation time and number of demonstrations increase significantly for MCE-IRL. All experiments were conducted on a machine with AMD Ryzen 7 3700X 8-core CPU. Lastly, MCE-IRL was not able to recover the reward for the multiple sequential goals, whereas the integrated method was able to do so and found a policy that visited both goals safely and in the shortest time. Unlike many existing IRL techniques, the integrated method also does not involve solving an MDP during the reward inference procedure and the rewards inferred using the integrated method provide better interpretability w.r.t. the specifications. The complexity of the reward inference procedure is polynomial in the length of the specification and hence isn't affected by the dimensionality of the state space based on empirical evaluations. As shown in experiments, the integrated algorithm can be used with multiple demonstrators each of whom may be trying to act according to their preferences for the same task.

In one embodiment, a framework is provided that combines human demonstrations and high-level STL specifications to: (1) quantitatively evaluate and rank demonstrations and (2) infer non-Markovian rewards for a robot such that the computed policy is able to satisfy all specifications. The framework provides new directions for safety and interpretability of robot control policies and verification of model-free learning methods. Since the framework (a) does not introduce additional hyperparameters, (b) can learn from a few demonstrations and (c) facilitates safer and faster learning, it is appropriate for non-expert users and real-world applications. It is also well suited for applications where the maps are known beforehand but there exist dynamic obstacles in the map, such as for robots in household and warehouse environments, space exploration rovers, etc.

Reinforcement Learning (RL)

(Model-Free Markov Decision Process (MDP)). It is a tuple $M=(S, A, R, \gamma)$ where S is the state space of the system;

A is the set of actions that can be performed on the system;

R is a reward function that typically maps either some $s \in S$ or some transition $\delta \in S \times A \times S$ to R;

$\gamma$ is the discount factor for the MDP.

Quantitative Semantics of STL

A basic example of STL and the mathematical definition of quantitative semantics are described below.

Figure 12:
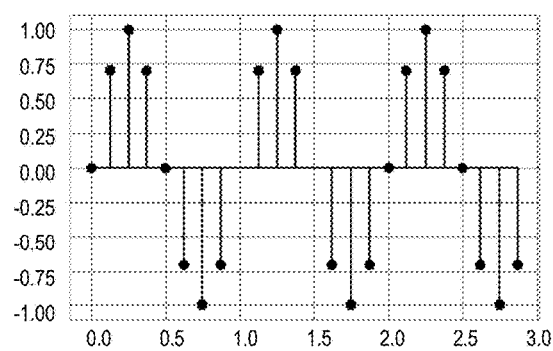
FIG. 12 is a graph depicting properties on a sin wave.

Consider the signal x(t) obtained by sampling the function sin (2πt) at times t0, t1, . . . , where tj=j×0.125 (shown in FIG. 12). Consider the formula G(x(t)≥−1), which requires that starting at time 0, x(t) is always greater than −1 (at each sample point). Consider the formula F[0,3](G[0,1](x(t)≥0)). This formula requires that there is some time (say τ) such that between times [τ, t+1], x(τ) is always greater than 0. Considering that x(t) is a sampling of a sinusoid with period 1, this formula is also satisfied by x(t).

Quantitative Semantics for Signal Temporal Logic. Given an algebraic structure (⊕, ⊗, >, ⊥), we define the quantitative semantics for an arbitrary signal x against an STL formula φ at time t as shown in FIG. 33

Experiments

PyGame Setting

Figure 13A:
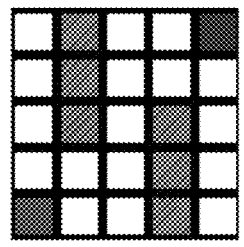
FIG. 13A shows example grid-world set up.
Figure 13B:
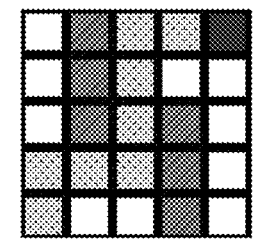
FIG. 13B shows example user demonstration (light grey dots)
Figure 14A:
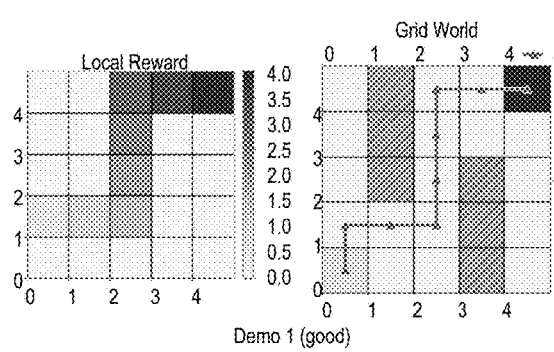
FIGS. 14A-14E show results for a 5×5 grid-world.
Figure 14B:
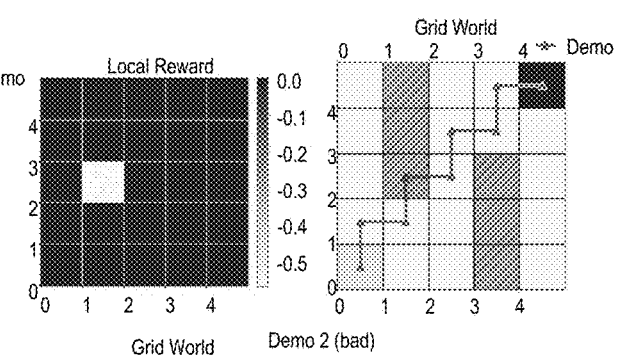
Figure 14C:
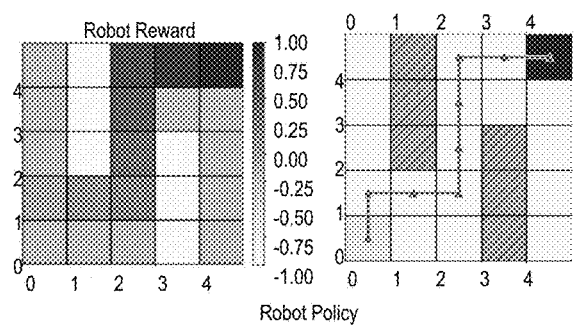
Figure 14D:
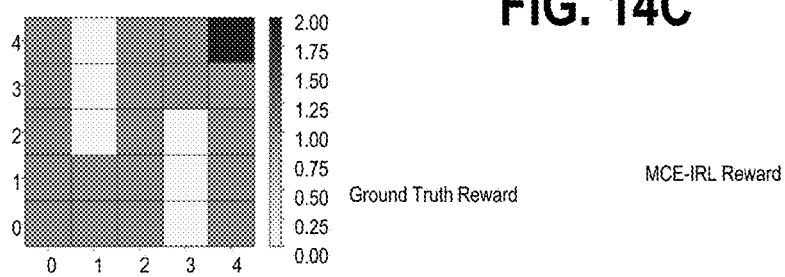
Figure 14E:
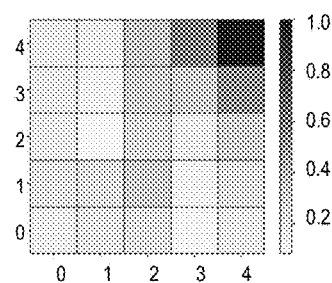
Figure 15A:
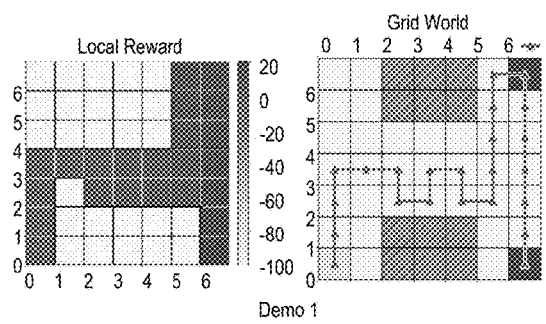
FIGS. 15A-15E show results for a 7×7 grid-world.
Figure 15B:
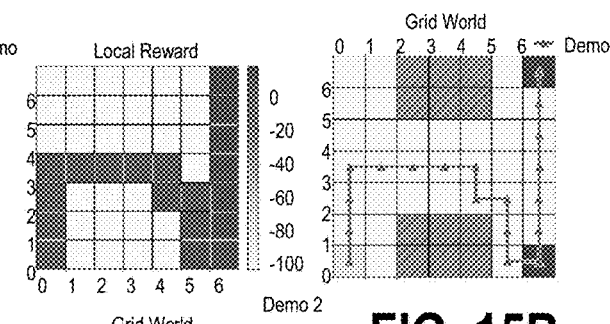
Figure 15C:
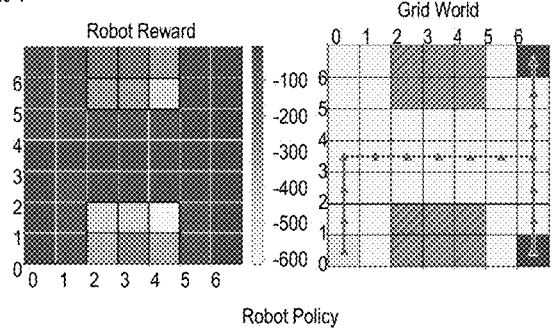
Figure 15D:
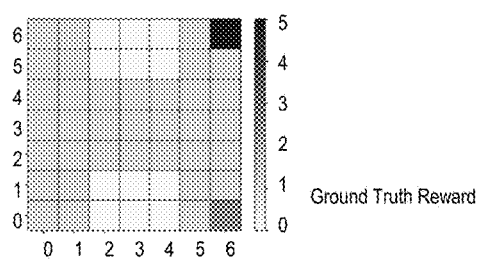
Figure 15E:
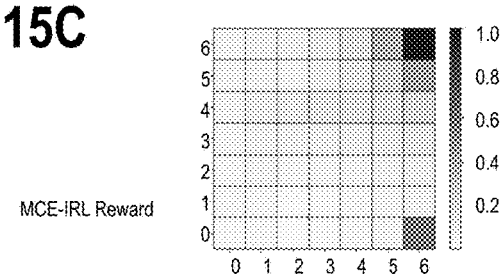

A screenshot of the grid-world created using PyGame package is shown in FIGS. 13A and 13B along with a sample demonstration. It is a point-and-click game/interface for a user to provide demonstrations. The task is to select or click on cells starting from the dark blue cell (bottom-left) and ending in the light blue cell (top-right). The grey hatched cells represent "avoid" regions or obstacles.

To illustrate with an example, consider the 5×5 grid-world for single goal as shown in FIGS. 14A-14E and described above. Two demonstrations are provided (1 good and 1 bad). In the good demonstration, the reward is assigned to every state appearing in the demonstration while other states are kept at zero. The rewards increase from start state to the goal so as to guide the robot towards the goal. In the bad demonstration, one of the states coincides with an obstacle and only that state is penalized. The final robot reward is a linear combination of the demonstration rewards. We also show the ground truth reward for this map and the rewards extracted using MCE-IRL with over 40 optimal demonstrations. It is clear again that the integrated method infers more interpretable rewards than the state of the art MCE-IRL, while using far fewer demonstrations. We obtain similar comparisons for other grids.

Multiple Sequential Goal Grid-World

The plots in FIGS. 15A-15E show the demonstration and learned robot policy for the multi-goal 7×7 grid-world. Left figures in each sub-figure represent learned/inferred rewards. Right figures show the grid-world with start state (light grey), goal (dark grey), obstacles (grey hatched) and demonstration/policy (grey arrow). There are two goals and the rewards are inferred accordingly. At the next step, the algorithm enumerates all possible policies: (a) start→goal1→goal2 and (b) start→goal2→goal1. The final policy is a hybrid of the demonstrations while trying to minimize the time (soft requirement). In this case, it infers a policy start→goal1 (top-right)→goal2 (bottom-right). For sequential goals, MCE-IRL is unable to learn any reward even from 300 demonstrations. As we see in the figure, MCE-IRL has 2 problems: (1) it doesn't learn the reward for obstacles/avoid regions and (2) it learns only when there are 2 independent terminal states, i.e., it does not consider the sequential visitation of goals or that all goals must be covered by the policy. Hence a policy with the MCE-IRL reward and our multi-sequential goal algorithm is forced to visit goal2 and then goal1, thereby restricting the specification only to this order. MCE-IRL can also learn higher rewards for states other than the terminal states. Hence, for some cases in experiments, the policy was able to visit only one goal while ignoring the other.

Frozenlake

Figure 16A:
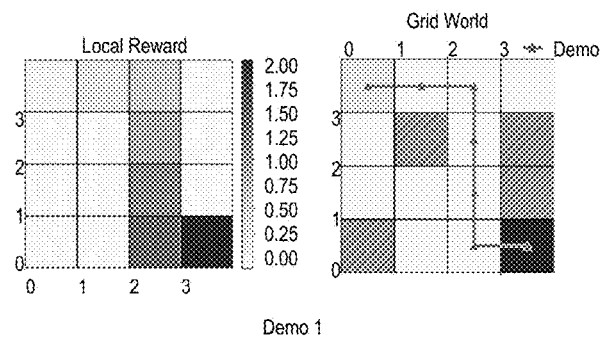
FIGS. 16A-16C show results for a 4×4 FrozenLake.
Figure 16B:
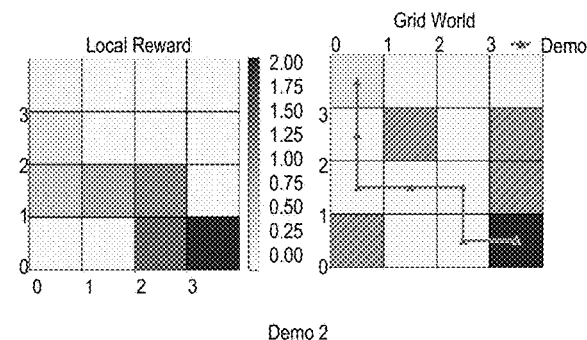
Figure 16C:
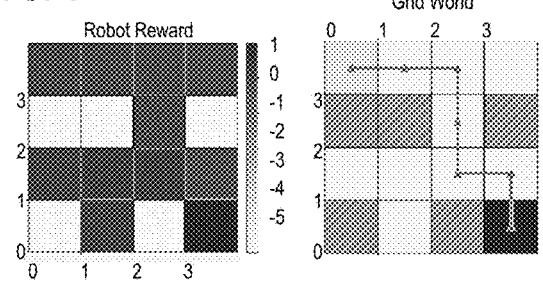
Figure 17A:
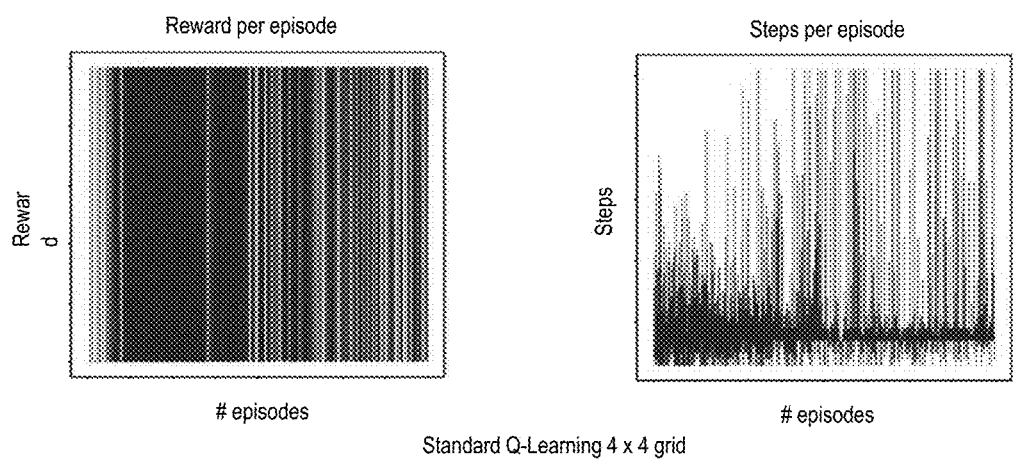
FIGS. 17A and 17B show statistics indicating the exploration rate of each algorithm as well as rewards accumulated in each training episode.
Figure 17B:
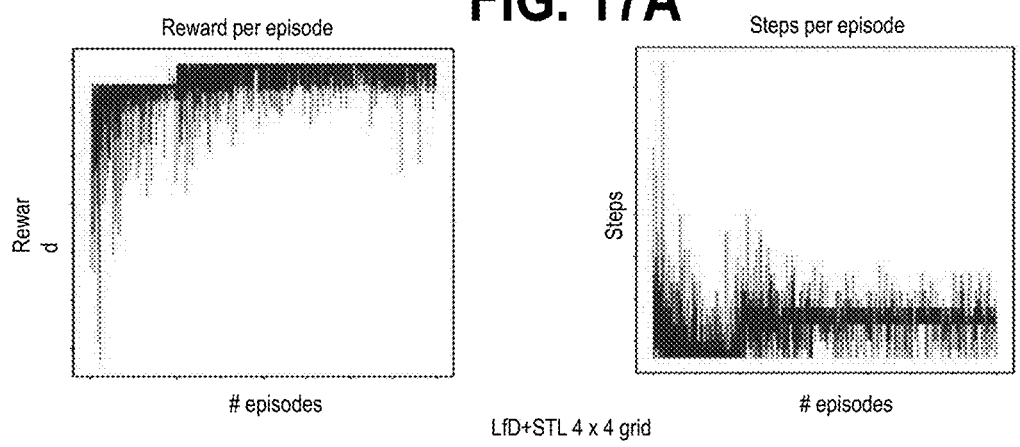
Figure 18A:
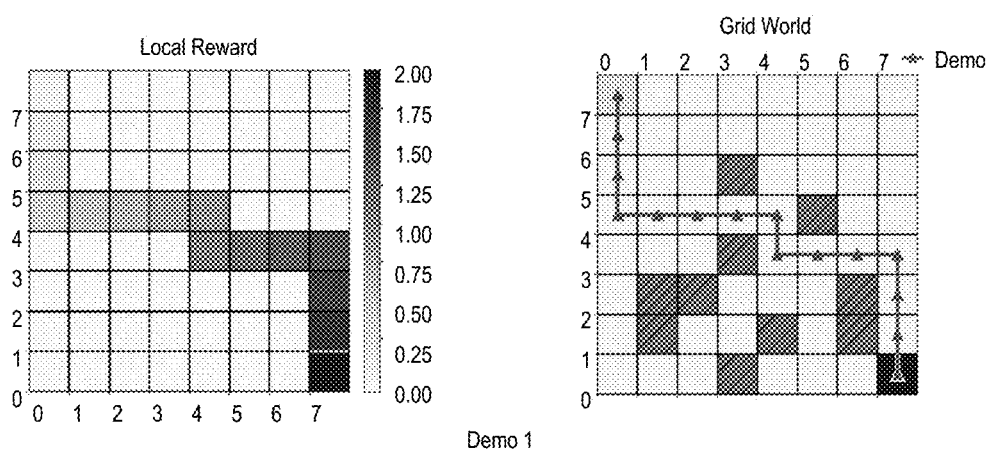
FIGS. 18A-18E show results for 8×8 FrozenLake.
Figure 18B:
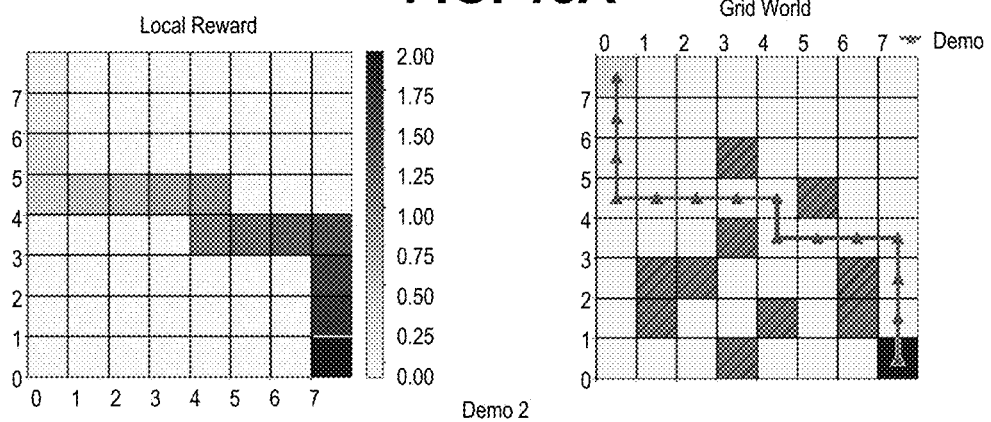
Figure 18C:
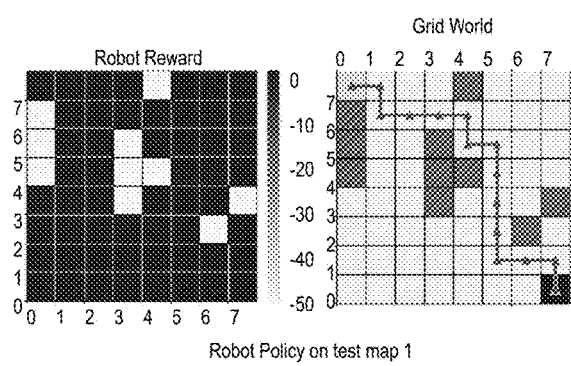
Figure 18D:
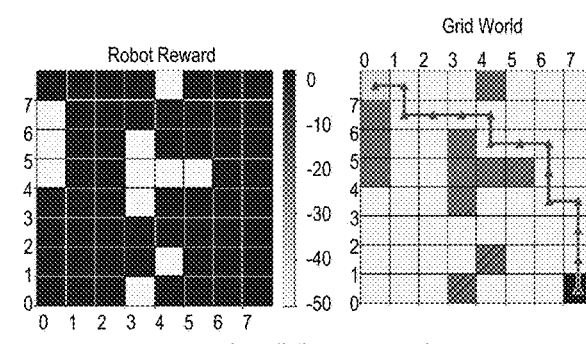
Figure 18E:
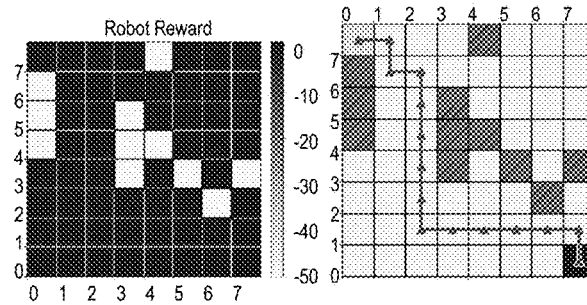

The results in FIGS. 16A-16C show the robot policy in which demonstrations were provided on one map, but the agent had to use that information and explore on an unseen map. Left figures of each sub-figure represent learned rewards. Right figures show the grid-world with start state (light grey), goal (dark grey), obstacles or holes (grey hatched) and demonstration/policy (green). The robot is finally tested on a different map. FIGS. 17A and 17B show comparisons in the exploration space between the integrated method and standard Q-Learning with hand-crafted rewards.

Similar results were obtained in the 8×8 grid size Frozenlake (see FIGS. 18A-18E). A total of 5 demonstrations (4 good and 1 incomplete) were provided on a particular map. The agent then had to explore and learn a policy on 3 different maps using only the rewards from the map on which demonstrations were provided. The obstacles were moved about in each of the test/unseen maps and we see that the agent was able to successfully learn a policy to reach the goal.

Mountain Car Results

FIGS. 19A-19C shows the demonstrations and rewards inferred in this environment. In particular, for the mountain car, a 50×50 grid size is used to show the scalability of the integrated approach and its performance for sparse rewards. Other grid sizes used for experiments were 75×75 and 100×100.

Example 2: Learning From Demonstrations Using Signal Temporal Logic in Stochastic and Continuous Domains As discussed herein, the LfD and temporal logic approach seeks to use both, the user demonstrations and the specifications to learn rewards from which a control policy can be extracted via RL. In this framework, the user explicitly provides demonstrations and high-level specifications in a mathematically precise and unambiguous formal language-Signal Temporal Logic (STL). An STL formula evaluates a temporal behavior of a system (in our case, a demonstration or agent's policy) and provides a quantity that indicates how well this system satisfied the formula via a fitness quantity called robustness that is then used to define rewards. In general, the STL specifications tell the agent "what to do," while the rewards obtained by evaluating the quality of demonstrations tell the agent "how to do it". STL does not define the entire reward function, but only some parts or sub-spaces of it and hence our framework uses demonstrations for learning rewards. In the real-world there may be uncertainties in the agent's motion/actions and environment. In this example, we significantly extend the existing LfD-STL framework to stochastic environments. Existing work also assumes discrete state spaces, which allows the use of tabular reward functions and tabular RL methods. In this letter, we extend our approach to continuous state spaces which necessitates continuous approximations for reward functions and the concomitant continuous-space RL algorithms.

As discussed above in example 1, we use STL specifications (i) to evaluate and automatically rank demonstrations based on their robustness, and (ii) to infer rewards (considering environment stochasticity) to be used in an RL procedure used to train the control policy. While we also use the directed acyclic graph-based ranked re-wards from we provide a new technique to handle stochasticity and continuous state spaces. The intuition is to create a "tube" around the trajectory represented by a demonstration. This tube represents the possible states the demonstrator could have been in, i.e., we devise a mechanism to propagate the rewards to nearby states. In this way, a novel mathematical way of inferring temporal/non-Markovian rewards for a system under probabilistic transition dynamics without the necessity for optimal or perfect demonstrations is provided. A re-ward approximation and prediction method applicable for continuous and higher dimensional spaces is developed. These rewards can be used with appropriate RL methods such as policy gradients or actor-critic algorithms. Further, we show that this method can learn from a handful of demonstrations even in the presence of uncertainties in the environment. Furthermore, we validate our method on several discrete-world environments and also on a custom 2D driving scenario.

As discussed above, an environment is a tuple E=(S, A) consisting of the set of states S defined over $\mathbb{R}^n$ and set of actions A.

A finite sequence of state-action pairs is called a demonstration. Formally, a demonstration d of length $L \in \mathbb{N}$ is $d=((s_1, a_1), (s_2, a_2), \ldots (s_L, a_L))$, where $s_i \in S$ and $a_i \in A$. That is, d is an element of $(S \times A)^L$.

Signal Temporal Logic (STL), also discussed above, is a real-time logic, generally interpreted over a dense-time domain for signals whose values are from a continuous metric space (such as $\mathbb{R}^n$). The basic primitive in STL is a signal predicate μ that is a formula of the form f (x(t))>0, where x(t) is the tuple (state, action) of the demonstration x at time t, and f maps the signal domain D=(S×A) to $\mathbb{R}$. STL formulas are then defined recursively using Boolean combinations of sub-formulas, or by applying an interval-restricted temporal operator to a sub-formula. The syntax of STL is formally defined as follows: $\varphi ::= \mu |\neg \varphi| \varphi \wedge \varphi |G_I \varphi| F_I \varphi |\varphi U_I \varphi$. Here, I=[a, b] denotes an arbitrary time-interval, where a, $b \in \mathbb{R}^{\geq 0}$. The semantics of STL are defined over a discrete-time signal x defined over some time-domain $\mathbb{T}$. The Boolean satisfaction of a signal predicate is simply True (T) if the predicate is satisfied and False (⊥) if it is not, the semantics for the propositional logic operators ¬, ∧ (and thus ∨,→) follow the obvious semantics. The following behaviors are represented by the temporal operators:

At time t, if $G_I(\varphi)$ holds then φ holds ∀t' in t+I.
At time t, if $F_I(\varphi)$ holds then φ holds at some t'∈t+I.
At time t, if $\varphi U_I \Psi$ holds then Ψ holds at some time t'∈t+I, and ∀t"∈[t, t'), φ holds.

Further, Given an algebraic structure (⊕, ⊗, ®, T, ⊥), we define the quantitative semantics for an arbitrary signal x against an STL formula φ at time t as in FIG. 33.

A signal satisfies an STL formula φ if it is satisfied at time t=0. Intuitively, the quantitative semantics of STL represent the numerical distance of "how far" a signal is away from the signal predicate. For a given requirement φ, a demonstration or policy d that satisfies it is represented as d⊨φ and one that does not, is represented as d⊭φ. In this work, we use the following interpretations of the STL quantitative semantics: T=+∞, ⊥=−∞, and ⊕=max, and ⊗=min. As discussed above in example 1, we make use of the two classes of temporal logic requirements: (i) hard requirements $\Phi_H$ which are particular properties of a system that are required to be invariant, such as requiring the system to follow the workspace rules or operate within its constraints at all times. These properties can be regarded as safety requirements for the system and they typically are of the form G(φ); and (ii) soft requirements $\Phi_s$ that are generally concerned with the optimality of a system such as performance, efficiency, etc. Hard requirements always need to be satisfied by a system before being able to satisfy the soft requirements. These requirements are arranged using a directed acyclic graph (DAG)G=(V, X), where each node in V represents a specification. Directed edges X in G correspond to the relative order/preferences of specifications and the weight on each node indicates the relative priority of its corresponding specification by analyzing number of nodes it is dependent on, i.e., for a node u in the DAG, its corresponding weight is given by w(u)=|V|−|ancestors(u)| as shown in FIG. 1. The ancestors of a node u are the set of all nodes in V that have a path to u, i.e., u is dependent on its ancestors.

Demonstration Types: Based on the 2 classes of logic requirements, we obtain 2 types of demonstrations: (i) a demonstration is labeled good if it satisfies the specifications $\Phi=\Phi_H \cup \Phi_S$; (ii) a demonstration is considered bad if it violates any hard specification of $\Phi_H$. A bad demonstration d consists of at least one state or state-action pair that violates a hard specification Ψi.e., $s_{bad}=\{s_j|(s_j|a_j) \not\models \Psi\}$.

DAG-based Rewards: As per the arrangement of specifications $\Phi=\Phi_H \cup \Phi_S$ in a DAG, we obtain the weight vector $w_\Phi = [w(\Phi_{|\Phi|} 0^T, \ldots, w(\varphi_{|\Phi|})]^T$; where, hard requirements are given by $\Phi_H=\{\varphi 1, \varphi 2, \ldots, \varphi_p\}$ and soft requirements are given by $\Phi_S=\{\varphi_{p+1}, \Phi_{p+2}, \ldots, \Phi_q\}$. For each demonstration d, we also obtain the corresponding robustness vector, $\vec{\rho}d=[\rho_1, \ldots, \rho_{|\Phi|}]^T$, where is the robustness of that demonstration w.r.t. $\varphi_i$. Finally, the DAG-based robustness for d is given by the weighted-sum $\hat{\rho}d=w_{|\Phi|}^T \cdot \vec{\rho}d$.

Markov Decision Process (MDP): An MDP is given by a tuple M=(S, A, T, R) where S is the state space of the system; A is the set of actions that can be performed on the system; $A=\{\alpha_1, \alpha_2, \ldots, \alpha_N\}$; T is the transition function, where T(s, a, s')=Pr (s'|s, a); R is a reward function that typically maps either some s∈S or some transition δ∈S×A×S to $\mathbb{R}$.

In RL, the goal of the learning algorithm is to find a policy $\pi:S \to A$ that maximizes the total (discounted) reward from performing actions on a MDP, i.e., the objective is to maximize $$\sum_{t=0}^{\infty} \gamma^t r_t,$$

where $r_t$ is the output of the reward function R for the sample at t and $\gamma$ is the discount factor. In this letter, we assume full observation of the state space for agents operating in known We seek to infer rewards from user demonstrations and STL specifications while considering the environment's uncertainty. Given a reward-free MDP M={S, A, T}R, a finite set of high-level specifications in STL $\Phi = \Phi_H \cup \Phi_S$ and a finite dataset of human demonstrations D={$d_1, d_2, \ldots, d_m$} in an environment E, where each demonstration is defined as in Definition 2, the goal is to infer a reward function R for M such that the resulting robot policy $\pi$ obtained by an RL algorithm, satisfies all the requirements of $\Phi$.

Methodology

STL-Based Rewards for Stochastic Dynamics

To address stochasticity in environments, we provide a stochastic reward definition for the agent and show that the rewards inferred for deterministic transitions are a special case of the new reward function. Rationally, one would expect an agent to perform a given task correctly by following the good demonstrations and hence the rewards would be based on such demonstrations. Initially, we follow the DAG-based procedure to obtain the cumulative robustness $\hat{\rho}_d$ for a demonstration d as described in Section II-A. Given a demonstration $$d = \langle s_i, a_i \rangle_{i=1}^L$$

and the final DAG robustness $\hat{\rho}_d$, we derive a procedure to estimate the "true" reward $R_d$ of the demonstration as if the transitions were deterministic. In other words, $R_d = \hat{\rho}_d$ is the reward that the agent would maximize if it were in a deterministic environment. When the environment is stochastic, $R_d$ should increase along the demonstrations to prevent the agent from moving away from the states seen in such demonstrations, i.e., the rewards for a demonstration behave as attractors because they persuade the agent to follow the good demonstration as much as possible. Hence, as the environment uncertainty increases, $R_d$oh. also increases. Here, we consider the states and actions as observed in a demonstration d—the agent starts in state $s_1$ and executes the corresponding action $a_1$a1 as seen in d. Assuming Markovian nature of the environment's stochastic dynamics, for subsequent state-action tuples in d we have, $$Pr(s_L|\tau = (s_1)_{i=1}^{L-1}, a_{L-1}) = \prod_{l=1}^{L-1} Pr(S_{l+1}|S_l, a_l) \quad (4)$$

where each $a_i$ is the action indicated in the demonstration and $\tau$ is the (partial) trajectory/demonstration till a particular state. Hence, the true reward $R_d$ can be expressed as follows:

$$Pr(s_L|\tau = (s_1)_{i=1}^{L-1}, a_{L-1}) \cdot R_d = \hat{\rho}_d \quad (5)$$

$$R_d = \frac{\hat{\rho}_d}{\prod_{l=1}^{L-1} Pr(s_{l+1} \in d | s_1 \in d, a_l \in d)}$$

This equation reflects that $R_d$ increases as uncertainty increases, i.e., as $Pr(s'|s, a) \to 0$ in the environment. In order to account for the stochasticity, we define $R(s, a_x)$ the set of all states that are reachable from a given state s in one step (since it is an MDP) by performing all actions other than its corresponding action $a_2$ appearing in a demonstration.

Reward Assignments for Demonstrations

We first present the reward assignments for the discrete-state case and then describe the procedure for continuous state spaces. The rewards for all states are initially assigned to 0.

1) Good Demonstrations: For all state-action pairs occurring in a demonstration d, $r_d(s_l)$ describes the reward assigned to state $s_l \in d$. The reward function is given by Equation (6).

$$r_d(s_1) = Pr(s_{l-1}|s_{l-1}, a_{l-1}) \cdot \frac{1}{L} \cdot R_d$$

$$\forall s_{l=1}, s_l, a_{l-1} \in d$$

$$r_d(s') = Pr(s'|s_{l-1}, a) \cdot r_d(s_l)$$

$$s' \in R(s_{l-1}, a_{l-1}) - \{s_l\}; a \in A - \{a_{l-1}\} \quad (6)$$

Where $l \in [1, L]$. When, l=1 (initial or base case), $Pr(s_l|s_0, a_0)$ represents the probability of the agent starting in the same state as the demonstrations and ($s_0$, $a_0$) is introduced for notational convenience. Good demonstrations have strictly non-negative rewards as they obey all specifications. The rewards in such demonstrations behave as attractors or potential fields to persuade the agent to follow the good demonstrations as much as possible. The shape of this reward function resembles a "bell curve".

2) Bad Demonstrations: A bad demonstration will have strictly negative robustness, that is amplified as the true reward $R_d$ as per (Equation (5)).

$$r_d(s_l) = Pr(s_l/s_{l-1}, a_{l-1}) \cdot R_d, \text{ if } s_l \in s_{bad}$$

$$r_d(s') = Pr(s'/s_{l-1}, a) \cdot r_d(s_l),$$

$$s' \in R(s_{l-1}, a_{l-1}); a \in A - \{a_{l-1}\} \quad (7)$$

The rewards in other all states are zero. The rewards in such demonstrations behave as repellers deflect the agent from bad states. The shape of this reward function resembles an "inverted bell".

For a demonstration d, the induced reward $r_d(s)$ is the reward induced by demonstration d for any state s in the state space, computed via Equations (9) and (10). Let $r_d(s') < r_d(s)$ denote that $r_d(s') < r_d(s')$ if d is a bad demonstration and $r_d(s) > r_d(s')$ if d is a good demonstration, for $s \in d$ and $s' \notin d$.

Lemma 1: For any demonstration d, $\forall s_l \in d$, $r_d(s^1) < r_d(s_l)$

Proof Sketch: The sum of transition probabilities in a state over all actions is 1. Hence, the product of 2 of these probabilities (as for $r_d(s')$ in Equations (9) and (10)) is less than either of them and is a positive quantity. Therefore, in good demonstrations, the neighbor states s' have lower rewards than the observed state $s_l$, thereby influencing the agent to not prefer states not seen in good demonstrations and also that there is a possibility that the neighbors are bad states. For bad demonstrations, the neighbors s' have higher rewards than the bad states and are still negative, which influence the agent to move away from bad states and also that there is a chance these neighbors could be good states.

Finally, once each demonstration is assigned rewards, they are ranked by their respective $R_d$ values and a rank-based weighted sum is computed to obtain the final reward for the MDP.

Special Cases

In this section, we show how the deterministic rewards from the prior LfD-STL framework is a special case of our reward formulation. We also describe a stochastic model used in our experiments.

Deterministic: In the case of deterministic transitions, the agent follows the selected action (i.e., Pr(s'/s, a)=1) while all other actions have probability of 0. As a result, the probability of transitioning to the neighbor states in 1-step via the other actions is 0. Therefore, this reduces to the same equations described in. By Equation (4), $R_d = \hat{p}_d$. The rewards for each type of demonstration are as follows:

Good Demonstration:

$$r_d(s_l) = \frac{1}{L} \cdot R_d, \quad (8)$$
$$\forall s_l a_1 \in d; 1 \in \lfloor 1, L \rfloor$$

Bad Demonstration:

$$r_d(s_1) = \begin{cases} R_d & \text{if } s_1 \in s_{bad} \\ 0, & \text{otherwise} \end{cases} \quad (9)$$

Stochastic: Let $p \in [0,1)$ denote the uncertainty of the environment: the agent follows or executes a selected action $a \in A$ with probability Pr(s'/s, a)=1-p and due to the uncertainty, randomly follows/chooses one of the remaining N-1 actions uniformly, i.e., with probability p/(N-1). The sum of probabilities of all transitions or actions is 1. Thus, for a demonstration d, the agent follows d with probability $(1-p)^{L-1}$, by Equation (7). Substituting this in Equation (2), the true reward is:

$$R_d = \frac{\hat{p}_d}{(1-p)^{L-1}} \quad (10)$$

With regards to the "attractor-repeller" intuition stated earlier, as the uncertainty p increases, $R_d$ also increases, influencing the agent to follow along the demonstrations. For each type of demonstration, the rewards are described below:

Good Demonstrations $$r_d(s_l) = (1-p) \cdot \frac{1}{L} \cdot R_d; \forall S_l \in d \quad (11)$$
$$r_d(s') = \frac{p}{N-1} \cdot (1-p) \cdot \frac{1}{L} \cdot R_d,$$
$$s' \in R(s_{l-1}, a_{l-1}) - \{s_l\}; a \in A - \{a_{l-1}\}$$

where $l \in [1, L]$. For the initial state, $Pr(s_1/s_0, a_0)$ could be 1-p or simply 1 if the agent is known to always start from that state. From the above equations and Lemma 1, $r_d(s')$ is guaranteed to be lower than $r_d(s_l)$ since $0 < p < 1 \Rightarrow 0 < p/(N-1) < 1/(N-1) < 1$. By applying simple inequality rules, we can show that $(1-p) \cdot p/(N-1) < (1-p)$, which is the guarantee that reward is propagated in a decreasing manner to neighboring states not seen in the demonstrations.

Bad Demonstrations.

$$r_d(s_l) = (1-p) \cdot R_d; \text{ if } S_l \in s_{bad} \quad (12)$$
$$r_d(s') = \frac{p}{N-1} \cdot (1-p) \cdot R_d,$$
$$s' \in R(s_{l-1}, a_{l-1}); a \in A - \{a_{l-1}\}$$

A similar guarantee for reachable states holds here as well. The rewards in other all states are zero. We use this model for all our stochastic discrete environment experiments.

The case of p=1 or as p→1 represents that the agent is completely non-deterministic (i.e., it never transitions to the desired state or performs the action chosen). In this case, by computing the limits, we can see that the rewards for all states tend to either +∞ in the case of good and to −∞ in the case of bad demonstrations. In such scenarios, the demonstrator may adapt and provide adversarial actions so that the agent performs the originally intended behavior. We will investigate such adversary-influenced demonstrations for future work.

We emphasize that our approach is generic to any Pr(s's, a)∈ (0, 1) and non-uniformity in transition probabilities. The description of all these cases shows that our reward mechanism is complete for stochastic environments. The probabilistic rewarding scheme described above can possibly assign positive rewards in the case of good demonstrations (and negative in bad demonstrations) to bad (and good, respectively) states, leading to a reward discrepancy. However, this is compensated for when the STL-based RL algorithm uses the robustness of the partially learned policy w.r.t. hard specifications while learning, to detect and rectify any violations. Alternatively, providing more demonstrations would also overcome discrepancies in rewards, but are not required.

Continuous Domain Rewards

For continuous state-spaces, defining rewards for states only encountered in a demonstration is very restrictive and due to the continuous nature of the state and/or action spaces, and numerical accuracy errors, the demonstrations observed will rarely have the same state and/or action values. Additionally, providing demonstrations in this space is already subject to uncertainties. We can first compute the demonstration rewards from DAG-specifications and then assign rewards to the demonstration states as described in the previous section. We then rank the demonstrations and scale the assigned rewards by the corresponding demonstration ranks. The next step is to show how rewards from different demonstrations are generalized and combined over the state space. Since the states in the demonstrations are not exactly the same, simply performing a rank-based weighted sum of state rewards would be tedious due to the large state space. To address this, we collect the rank-scaled state rewards in a data set and perform regression. For each demonstration, we have a collection of tuples in the form of (state, reward) or (state, action, reward) and we can then parameterize the rewards as r(s, θ) or r(s, a, θ) respectively. Finally, we organize these points in a dataset to learn a function approximation $f_\theta$: S→R or $f_\theta$: S×A→R. Function approximations can be learnt via regression techniques like Gaussian Processes, neural networks (NN) such as feedforward deep NN, convolutional NN, etc., that take as input, the features of a state or state-action pair and output a single/scalar reward.

For discrete actions, it is straight-forward to compute the reachable set. But for continuous actions, in order to compute the reachable set from a given observed state with bounded time and actions, we model each observed state using a (multi-variate) Gaussian distribution and generate samples. These samples correspond to the reachable set and we can compute the probability of each sample belonging to that distribution, which gives us the transition probabilities. Specifically, instead of using each of the tuples in their raw form as training data, we represent them as samples of (multi-variate) Gaussian distribution with mean s or (s, a) and having a scaled identity covariance matrix representing the noise in the observations. We then generate k samples from the distribution of each observed state to represent the reachable set. For each of the k samples, we can estimate the probability of that sample belonging to the distribution of the observed state, which is the transition function that can be used to assign rewards as described earlier.

EXPERIMENTS

Stochastic Discrete Environment

We created a grid-world environment E consisting of a set of states S={start, goals, obstacles} of varying grid sizes such as: 5×5, 8×8 and 15×15 and randomly choosing the obstacle locations. We experimented with different values of the environment's stochasticity p∈ [0.1, 0.8]. We used Manhattan distance as the distance metric and formulated the STL specifications:

1) Avoid obstacles at all times (hard requirement): $\varphi_1$:= $G_{[O,T]}(d_{obs}[t] \geq 1)$, where T is the length of a demonstration and $d_{obs}$ is the minimum distance of robot from obstacles computed at each step t.
2) Eventually, the robot reaches the goal state (soft requirement): $\varphi_2$:=$F_{[O,T]}(d_{goal}[t]<1)$, where $d_{goal}$ is the distance of robot from goal computed at each step. $\varphi_2$ depends on $\varphi_1$ in the DAG.
3) Reach the goal as fast as possible (soft requirement): $\varphi_3$:=$F_{[O,T]}([t] \leq T_{goal})$, where $T_{goal}$ is the upper bound of time required to each the goal, which is computed by running breadth-first search algorithm from start to goal state, since the shortest policy must take at least $T_{goal}$ to reach the goal. $\varphi_3$ depends on both $\varphi_1$ and $\varphi_2$ in the DAG.

All environments are created using PyGame library and we define and evaluate the STL specifications using Breach. The users provide demonstrations in the PyGame interface by clicking on their desired states with the task to reach the goal state from start without hitting any obstacles. Due to the stochasticity, unaware to the users, their clicked state may not always end up at the desired location. The user then proceeds to click from that unexpected state till they quit or reach the goal. 4 demonstrations from a single user were collected, of which 2 are shown in FIGS. 20A-20C along with the inferred rewards and resulting robot policy under 20% stochastic environment. We obtained similar results for the other larger grid sizes considered in this experiment. Details for the OpenAI Gym Frozenlake 8×8 grid environment are shown in the supplemental video. In all cases, we used Double Q-Learning, which is appropriate for stochastic settings, with the modifications to the algorithm at 2 steps (reward update and termination) as described by. The number of episodes varied based on the environment complexity (grid size, number and locations of obstacles) of the gridworld. The discount factor γ was set to 0.8 and ∈ —greedy strategy for action selection with decaying ∈ was used. A learning rate of α=0.1 was found to work reasonably well. For 100 trials, with 20% environment uncertainty, the policy was found to reach the goal on average 81% of the time with the learned rewards.

Figure 21A:
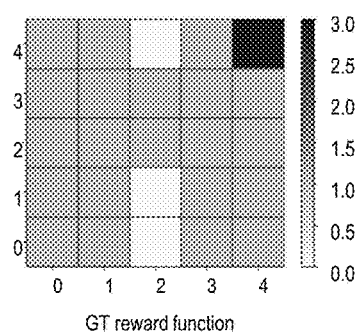
FIGS. 21A-21C show ground-truth (GT) rewards and rewards extracted by ME-IRL and MCE-IRL, respectively, each using 300 optimal demonstrations.
Figure 21B:
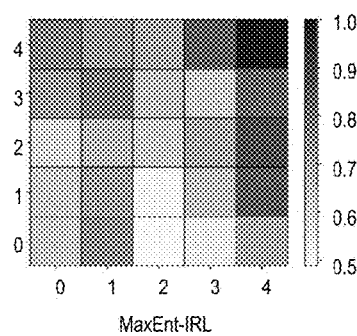
Figure 21C:
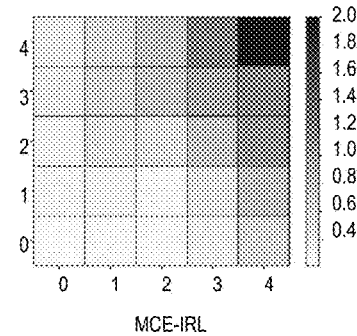

We then compared our method with the state-of-the-art IRL algorithm—Maximum Causal Entropy IRL (MCE-IRL) having unique features for each state, which required around 300 demonstrations in the 5×5 grid world under identical stochastic conditions and over 1000 demonstrations for the Frozenlake—8×8. Additionally, since MCE-IRL learns a reward for each state, it requires the demonstration set to cover all possible states, while ours does not require this criteria and hence can learn from few demonstrations. A ground-truth reward function for the 5×5 grid is shown in FIG. 21A. Qualitatively, from FIG. 20C and FIG. 21, we can observe that the rewards using our method are more aligned with the ground truth, compared to the others. For instance, the state at the center of the top row is an obstacle and both the IRL methods infer positive rewards for that state, while ours correctly computes a negative reward for the same using fewer samples. We remark that there are other recent works that learn from suboptimal demonstrations. However, at the core, they build on the entropy-based IRL methods and can learn more accurate rewards compared to MCE-IRL at the cost of generating additional demonstrations or manually defining an environment reward function in addition to the learned rewards. MCE-IRL offers a good balance between performance and sample complexity compared to these methods and since they all build on MaxEntropy-IRL, we used MCE-IRL for comparison. Furthermore, MCE-IRL and our method have the common objective of inferring rewards from demonstrations and mainly differ in the manner features are utilized: in MCE-IRL, features are directly used in computing the solution, while ours indirectly accesses the features via specifications.

Continuous-Space Environment

We used a simple car kinematic model that is governed by the following equations:

$$\dot{x} = \upsilon \cdot \cos(\theta) + \mathcal{N}(0, \sigma^2);$$
$$\dot{y} = \upsilon \cdot \sin(\theta) + \mathcal{N}(0, \sigma^2)$$
$$\dot{\upsilon} = \mu_1 \cdot \mu_2$$
$$\dot{\theta} = \upsilon \cdot \tan(\psi);$$
$$\dot{\psi} = \mu_3$$

where x and y represent the XY position of the car; θ is the heading; υ is the velocity; $u_1$ is the input acceleration; $u_2$ is the gear indicating forward (+1) or backward (−1); $u_3$ is the input to steering angle ψ. At any time instant t, the state of the car is given by $S_t$=[x, y, θ, v, $\dot{x}$, $\dot{y}$, $\dot{\theta}$, $\dot{v}$]$^T$. Users can control the car using either an analog Logitech G29 steering with pedal controller or via keyboard inputs. Alternatively, one could also use a similar setup for mobile robots using respective kinematics and a joystick controller for acute turns.

Figure 22:
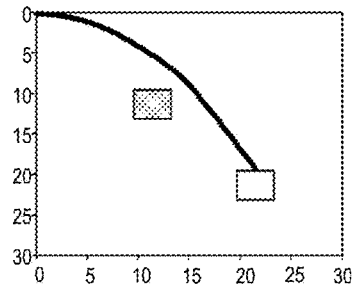
FIG. 22 shows a graph depicting an example car start point at the top-left corner and the task is to navigate to the goal while possibly avoiding potholes or obstacles (shaded box). A sample demonstration is shown by the black line trajectory.

The driving layout with goal and obstacle areas, and a sample demonstration is shown in FIG. 22. The task is to drive from the top-left corner to the center of the goal while avoiding any hindrances (obstacles, potholes, etc.), denoted by $\mathcal{H}$. As in any driving scenario, the car must maintain a safe distance dSafe from $\mathcal{H}$ and drive on the road/drivable surface. We collected 8 demonstrations (6 good and 2 bad) using a mixture of analog and keyboard inputs; one of the bad demonstrations passed through the pothole while another drove off the "road". The distance metric used in this space is Euclidean. The specifications for this scenario are as follows:

1) Avoid obstacles at all times (hard requirement): $\varphi_1 := G_{[O,T]}(d_{obs}[t] \geq dSafe)$, where T is the length of a demonstration and $d_{obs}$ is the minimum distance of the car from $\mathcal{H}$ computed at each step t. For our experiments, we used dSafe=3 units.
2) Always stay within the workspace/drivable region (hard requirement): $\varphi_2 := G_{[O,T]}((x, y) \in Box (30, 25))$, where the workspace is defined by a rectangle of dimensions 30×25 square units.
3) Eventually, the robot reaches the goal state (soft requirement): $\varphi_3 := F_{[O,T]}(d_{goal}[t] < \delta)$, where $d_{goal}$ is the distance between centers of car and goal computed at each step t and δ is a tolerance when the center of the car is "close enough" to the goal's center. $\varphi_3$ depends on $\varphi_1$ and $\varphi_2$ in the DAG.

Figure 23A:
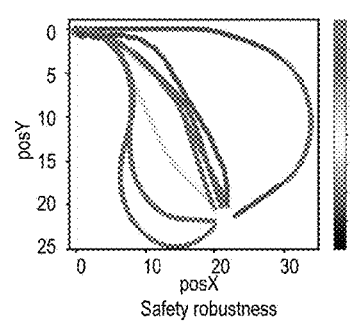
FIGS. 23A-D depict robustness of demonstrations with respect to each STL specification. Lighter grey trajectories indicate positive robustness and darker grey indicate negative.
Figure 23B:
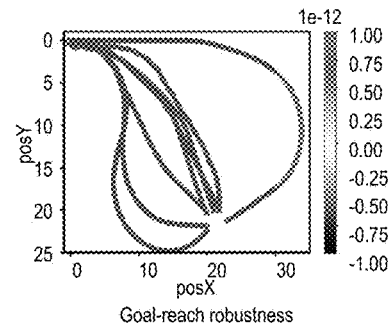
Figure 23C:
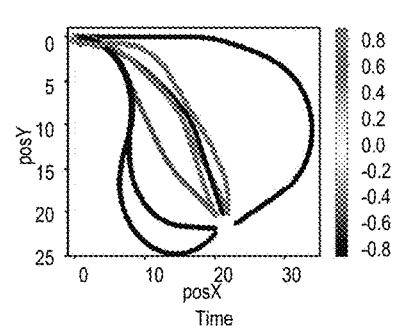
Figure 23D:
Figure 23E:
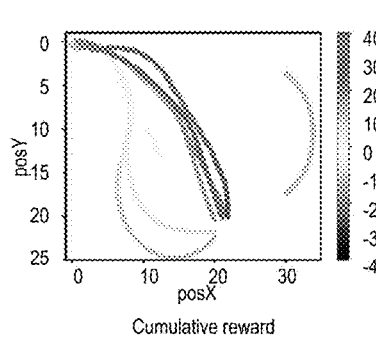
FIG. 23E shows final rewards based on cumulative robustness and demonstration ranking.
Figure 23F:
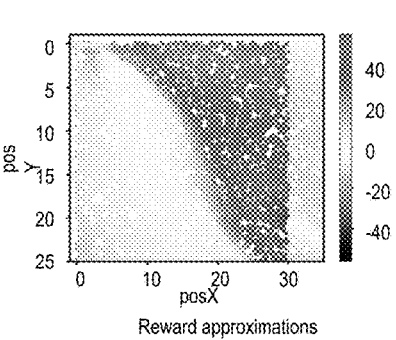
FIG. 23F shows reward approximation using neural networks. The lighter region represents the workspace of the agent, i.e., it is not allowed to leave that region.

Similar specifications can be used for manipulators and mobile robots. The collected trajectories along with their robustness for each STL specification and also for the time taken by them to reach the goal are shown in FIGS. 23A-23F. One of the bad demonstrations scraped the avoid-region and is shown in dark grey in FIG. 23A. All demonstrations reached the goal and are shown in grey in FIG. 23B. In FIG. 23C, 4 out of 8 demonstrations were slow to reach the goal compared to the others. One bad demonstration went "off track" and is shown in grey hatches in FIG. 23D. All these individual robustness values are combined via the specification-based DAG for each trajectory and rewards are assigned by modeling the states s as samples of multi-variate Gaussian distribution $N(\mu, \sigma^2 I)$ where $\mu$=s and σ represents the deviations in noise levels. For each s, we generated k=20 samples to represent the reachable set and assigned stochastic rewards as described in Section III. The final rewards are shown in FIG. 23E for low noise with σ=0.03 (for additional details on analysis of noise, please refer to the supplemental video). In the continuous spaces, we can observe that there is a large area of states with reward 0 (in white) and may not be particularly helpful since the agent rarely encounters the same state as seen in demonstrations due to noise. To overcome this issue, we approximated rewards over the state space using neural network regression. We thus combine the precision of Gaussian distributions for reward inference and the scalability of neural networks for predictions.

Remark 1: In all experiments, the reward plots were normalized and the maximum reward was capped to a sufficiently large value $R_{max}$ for the sake of practical/numerical implementation and visualization simplicity. Additionally, to combine robustness from semantically different STL specifications, we used tanh to normalize the robustness before combination. For the driving experiment, the state space has higher dimensions which becomes too convoluted to visualize. Instead, to show how the neural network regression would perform with smaller dimension inputs, we use the XY positions of the car along with the type of the XY state as inputs to the network. The type of the state is a one-hot encoding of whether the state represents an obstacle/avoid region, goal, outside-workspace or traversable region. We assume that a perception algorithm would provide the label of each state.

The neural network contained 2 hidden layers with 100 and 200 nodes respectively; and used the Adam optimizer with batch training for 20 epochs and RMSE loss. It was trained using PyTorch on a system with AMD Ryzen 7 3700X 8-core CPU and Nvidia RTX 2070-Super GPU. As we see in FIG. 23F, the predictions are closely correlated with the locations of various map features (boundaries, avoid regions and goal). In all the experimental scenarios, the final rewards can be verified w.r.t. the specifications to detect violations.

In this way, in the LfD-STL framework, uncertainty in the environment is considered to define temporal-based rewards from suboptimal demonstrations. The method also learns and predict rewards in continuous and high-dimension spaces. These rewards can be used to extract robust and interpretable RL control policies. The experiments on several stochastic discrete-worlds and in the driving scenario (continuous domain) illustrate the effectiveness and scalability of our method.

Example 3: Learning Explainable Performance Graphs from Demonstrations Via Evaluations Provided herein is the Performance-Graph Learning (PeGLearn) algorithm that systematically constructs the DAG from demonstrations and STL evaluations, resulting in a representation that explains the performance of demonstrations provided to the agent on the tasks. This framework is flexible to allow other forms of temporal logic or ratings (e.g., Likert scale) provided by humans, and is not limited just to STL.

Herein, we show how we can relax the need for users to specify this DAG, and rather learn from either the STL specifications themselves or have the users evaluate demonstrations by providing ratings/scores in an intuitive manner. For simple environments where the tasks can be easily expressed in STL, the DAG is automatically inferred from the robustness semantics of the temporal logic. In complex environments where it is non-trivial to express tasks in STL, we use expert annotations (ratings or scores) of the data. Examples of complex tasks in human-robot interactions can include descriptions like "tying a knot" or "fluency in motion" in robotic surgery, where it is difficult even for experts to express this task in formal logic, but easier to show the task via demonstrations and rate them. In our setting, rating scales such as Likert are similar to formal logic in the sense that: (i) we choose queries that assess performance and (ii) treat the ratings/scores as quantitative assessments. They are analogous and positively correlated because higher ratings and higher robustness values correspond to better performance systems. For example, some approaches use Likert ratings from humans as ground-truth measurements of trust. We perform diverse experiments to show the applicability of our method, such as in discrete-world settings and in a car driving (continuous domain) scenario where the high-level tasks are represented in STL. In this way, provided herein is a novel technique to learn performance-based DAG by evaluating demonstrations on tasks based on the quantitative semantics of temporal logic or ratings/scores provided by users and experts. Further, we show that the complexity of extracting the DAG is independent of the state and action spaces, and reduces the size of search space for obtaining the DAG. Furthermore, we conduct experiments in varied (simulated and realis-tic) domains and perform a user study on the Amazon Mechanical Turk platform to show that the graph-based explanations match the users' perceptions.

In this section, we provide various definitions and notations used in our methodology and experiments.

As discussed above, a demonstration is a finite sequence of state-action pairs in an environment that is composed of a set of states S and a set of actions A that can be performed by the agent. Formally, a demonstration $\xi$ of finite length $L \in \mathbb{N}$ is $\xi=((s_1, a_1), (s_2, a_2), \ldots, (s_L, a_L))$, where $s_i \in S$ and $a_i \in A$. That is, $\xi$ is an element of $(S \times A)^L$. Hereinafter, demonstration is indicated by $\xi$ and interchangeably referred to as trajectories.

Rating Function

Each environment is governed by tasks or objectives, which we refer to as specifications, denoted by $\varphi$. Some examples of specifications are: eventually reaching the goal, avoiding obstacles, driving within speed limits, etc. In this regard, we define a rating function as below.

A rating function $\mathcal{R}$ as a real-valued function that maps a specification and a time-series data or trajectory to a real number, i.e., $\mathcal{R}: \Phi \times \Xi \rightarrow \mathbb{R}$, where $\Phi$ is a finite set of all specifications and $\Xi$ is a finite set of all demonstrations or trajectories.

Intuitively, the rating function describes how "well" the specifications are met or satisfied by a trajectory. The rating function can be obtained via the quantitative semantics, such as robustness in temporal logics (refer to Appendix for definition) or human expert ratings (such as Likert scale) via surveys, questionnaires, annotations, etc. It indicates the score or signed distance of the time-series data to the set of temporal data satisfying a specification. For a given specification $\varphi$ and a demonstration $\xi$, the rating (also referred to as evaluation or score) of $\xi$ with respect to $\varphi$ is denoted by $\rho = \mathcal{R}(\varphi, \xi)$.

Directed Acyclic Graph

As discussed above, A directed acyclic graph (DAG) is an ordered pair G=(V, E) where V is a set of elements called vertices or nodes and E is a set of ordered pairs of vertices called edges or arcs, which are directed from one vertex to another. An edge e=(u, v) is directed from vertex u to vertex v. A path $u \leadsto v$ in G is a set of vertices starting from u and ending at v by following the directed edges from u. Each vertex $v \in V$ is associated with a real number—weight of the vertex, represented by w(v). Similarly, each edge $(u, v) \in E$ is associated with a real number—weight of the edge and is represented by w(u, v). Notice the difference in the number of arguments in the notations of vertex and edge weights.

To accomplish a set of tasks, we are given: (i) a finite dataset of m demonstrations $\Xi=\{\xi_1, \xi_2, \ldots, \xi_m\}$ in an environment, where each demonstration is defined as in Defination 1, (ii) a finite set of n specifications $\Phi=\{\varphi_1, \varphi_2, \ldots, \varphi_n\}$ to express the high-level tasks and by which a set of scores for each demonstration evaluated on each of the n specifications $\rho_\xi=[\rho_1, \ldots, \rho_{|\Phi|}]^T$ is obtained. We can then represent this as an m×n matrix $\mathcal{Z}$ where each row i represents a demonstration and a column j represents a specification. An element $\rho_{ij}$ indicates the rating or score of demonstration i for specification j, i.e., $\rho_{ij} = \mathcal{R}(\varphi_j, \xi_i)$.

$$Z = \begin{bmatrix} \rho_{11} & \rho_{12} & \cdots & \rho_{1n} \\ \rho_{21} & \rho_{22} & \cdots & \rho_{2n} \\ \vdots & \cdots & \ddots & \vdots \\ \rho_{m1} & \rho_{m2} & \cdots & \rho_{mn} \end{bmatrix}$$

As discussed above, LfD-STL, we need to compute a cumulative score or rating $r_\xi$ for each demonstration based on its individual specification scores and so we also have an m×1 vector $r=[r_{\xi 1}, r_{\xi 2}, \ldots, r_{\xi m}]^T$. To obtain the cumulative scores, we also require a scalar quantity or weight associated with each specification indicating its (relative) priority, preference or importance over other specifications. We thus have a weight vector $w=[w_1, w_2, \ldots, w_{|\Phi|}]^T$ from which we can obtain the cumulative scores as $\mathcal{Z} \cdot w = r$. In other words, for each demonstration $\xi$, $r_\xi = \rho_\xi^T \cdot w$.

The objective is to compute both w and r, given only $\mathcal{Z}$, such that the "better" demonstrations have higher cumulative scores than others; this is an unsupervised learning problem. One of the approaches to computing involves the demonstrator to specify their preferences encoded as a DAG and computing the weights via Equation 1, and then computing r. However, this is only a feasible approach if the number of specifications is small and also is not data-driven, i.e., it requires human inputs to define the weights. To overcome this, we can rely on data-driven machine learning approaches such as unsupervised learning. So we provide a new approach by learning a DAG directly from demonstrations (i.e., without human inputs) and using Equation 13 to compute weights for the LfD-STL framework to extract rewards for reinforcement learning tasks. The DAG contains the elements of $\Phi$ as its vertices and edges representing the relative differences in performance between specifications. We refer to this as the Performance-Graph since the performance of the demonstrations w.r.t. the task specifications are captured by it. This final graph is required to be acyclic so that topological sorting can be performed on the graph to obtain a linear ordering of the nodes and hence specifications, i.e., topological ordering does not apply when there are cycles in the graph.

$$w(\varphi) = |\Phi| - |\text{ancestor}(\varphi)| \qquad (13)$$

where, ancestor $(v)=\{u | u \leadsto v, u \in V\}$, i.e., the ancestors of a vertex v is the set of all vertices in G that have a path to v.

Rating-Based Graph

In this section, we describe the procedure to create the Performance-Graph from ratings or scores obtained either automatically by formal logic or provided by experts. This process involves 3 main steps:
1) Constructing a local weighted-DAG for each demonstration based on its corresponding score.
2) Combining the local graphs into a single weighted directed graph, which is not necessarily acyclic as it can contain bi-directional edges between nodes.
3) Converting the resultant graph into a weighted DAG.

Figure 24:
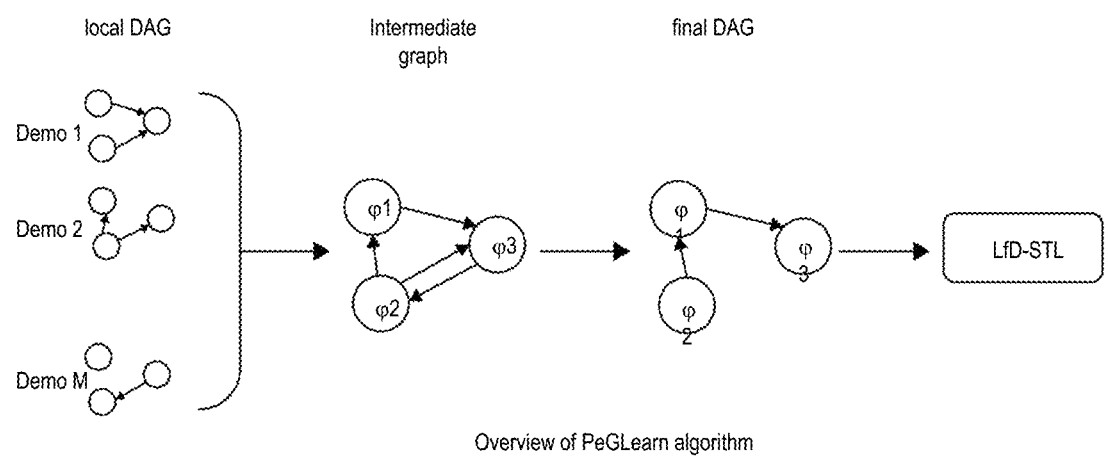
FIG. 24 shows an example overview of an algorithm for DAG generation.
Figure 25A:
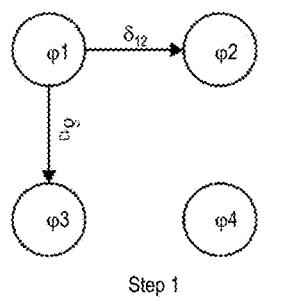
FIGS. 25A-25C show example steps in an example local graph for a demonstration.
Figure 25B:
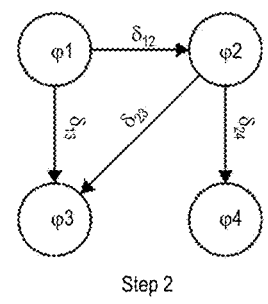
Figure 25C:
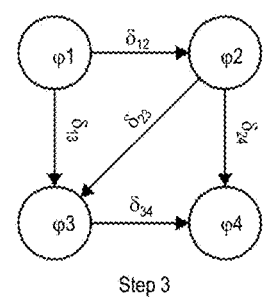
Figure 26A:
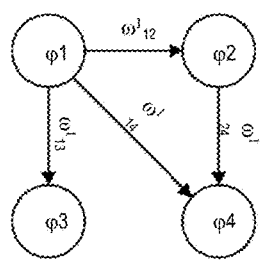
FIGS. 26A-26D show example global graphs from two demonstrations.
Figure 26B:
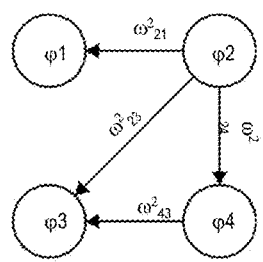
Figure 26C:
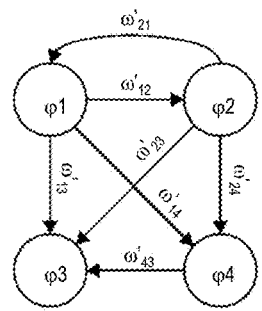
Figure 26D:
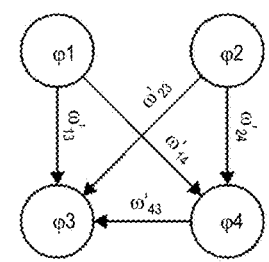
Figure 27B:
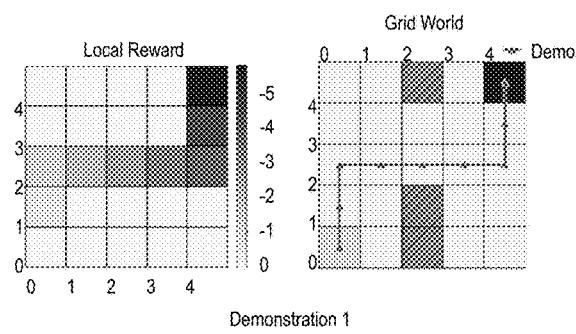
FIGS. 27A-27D show results for 5×5 grid. Inferred rewards are shown in left figures; Right figures show the grid-world with start state (light grey), goal (dark grey), obstacles (grey hatch) and demonstration/policy (grey arrow)
Figure 27C:
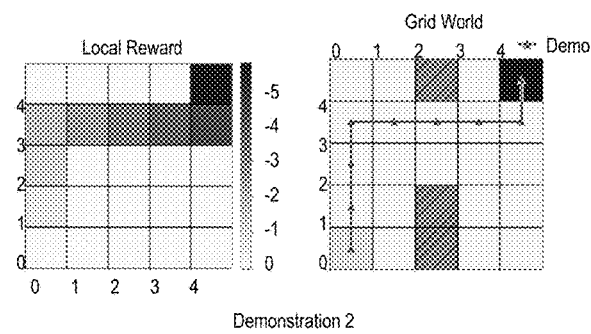
Figure 27A:
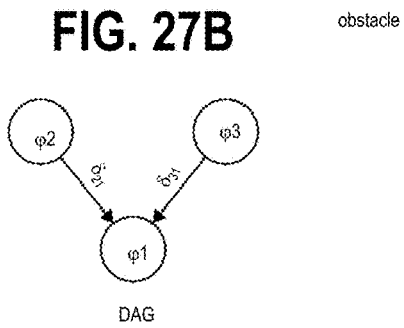
Figure 27D:
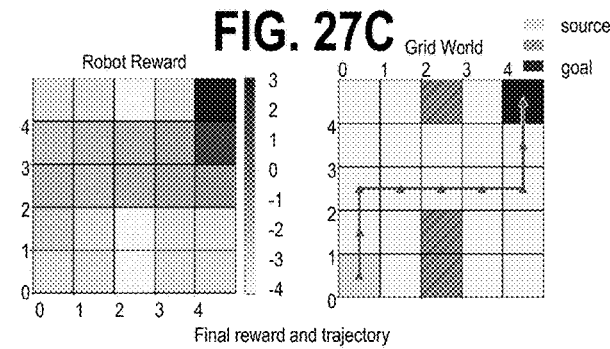
Figure 29B:
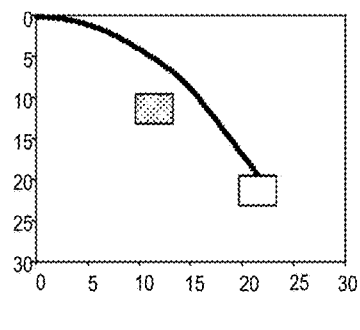
FIGS. 29A-29D show Results for the 2-D Dubins car simulator.
Figure 29C:
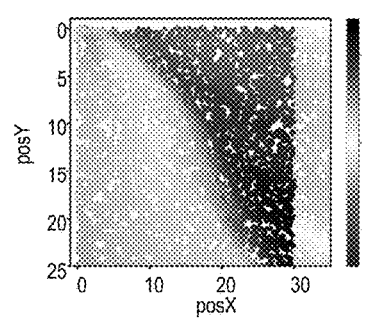
Figure 29D:
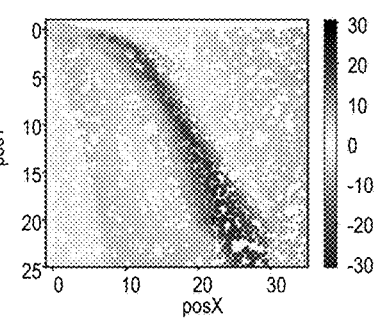
Figure 29A:
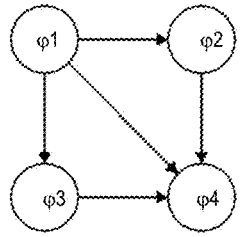

The framework is shown in FIG. 24 which depicts the 3 steps described above and the final stage where the inferred DAG is used with the LfD-STL framework to learn rewards and perform RL.

Generating Local Graphs

Each demonstration $\xi \in \Xi$ is associated with a vector of ratings $\rho_\xi = [\rho_1, \ldots, \rho_{|\Phi|}]^T$. The objective is to construct a weighted DAG for $\xi$ from these evaluations. Initially, the evaluations are sorted in non-increasing order, breaking ties arbitrarily. This creates a partial ordering based on the performance of the demonstrations regarding each specification and hence, a DAG is one of the common ways to represent this ordering. Though DAGs can be represented via adjacency lists and adjacency matrices, in this work, we represent them using adjacency matrices for notational convenience.

Consider 4 specifications $\varphi_i$; $i \in \{1, 2, 3, 4\}$. Let a demonstration, say $\xi \in \Xi$ have evaluations $\rho_\xi = [\rho_1, \rho_2, \rho_3, \rho_4]$ and without loss of generality, let them already be sorted in non-increasing values, i.e., $\rho_i \geq \rho_j$; $\forall i < j$. This sorting is performed in the first for loop and edges are then added to the DAG. Recall that each node of the DAG is a representation of each specification of $\Phi$. An edge between two nodes $\rho_i$ and $\rho_j$ is created when the difference between their corresponding evaluations is greater than a small threshold value. This edge represents the relative rating or performance difference between the specifications and creates a partial ordering indicating the same. The threshold $\epsilon$ acts as a high-pass filter and can be tuned depending on the complexity of the environment, and the intuition is that demonstrations exhibiting similar behaviors will have similar evaluations for the specifications, and hence an edge is created if the evaluations differ greatly. This is needed when combining 2 robustness values of say, 1.0 and 0.999, which are numerically different, but have similar performance. Without this filter, an edge with a very small weight would be created even for similar behaviors. Formally, $e(\varphi_i, \varphi_j)$ is added when $\delta_{ij} = (\rho(\varphi_i) - \rho(\varphi_j)) \geq \epsilon$. The first step is shown as an example in FIG. 25A. We repeat this process for each node in the DAG (shown in the subsequent steps of FIGS. 25A-25C and the resultant DAG will have at most $n(n-1)/2$ edges, where n is the number of specifications in P. This number is derived from the fact that the maximum number of edges in the DAG occur when the DAG is fully connected. The local graph is acyclic, because the nodes are sorted by their respective evaluations in a non-increasing order and hence edges with negative weights will not be added thereby eliminating any bi-directional edges. The DAG for a demonstrations imposes a partial order over all specifications. For any 2 specifications $\varphi_i$ and $\rho_j$, $\varphi_i \succeq \varphi_j$ if $\varphi_i \geq \varphi_j$ and so an edge is created from $\varphi_i$ to $\varphi_j$ with weight $\rho_{\varphi i} - \rho_{\varphi j}$.

In general, given n specifications and a set of algebraic operators (e.g., op={>, =}), the number of different orderings is: $n! \cdot [|op|^{n-1} - 1] + 1$. In our case, $|op| = 2$ since the operator < in an ordering is equivalent to a permutation of the ordering using >. For example, a<b is the same as b>a and a=b is also the same as b=a. Hence any search algorithm would have to explore in such a large space of duplicate/overlapping orderings. By making use of directed graphs, we can eliminate the factorial component (refer to the Appendix for proof), but this still results in an exponential-time search algorithm. To overcome this, in our algorithm, we eliminate cycles by building a DAG for each of the m demonstrations. Depending on the data structure used, the complexity of building a DAG is linear when using adjacency lists and quadratic when using adjacency matrix to represent the graph. The total complexity is thus $\mathcal{O}(mn^2)$ (using matrix representation) in the worst case, thereby producing a polynomial-time algorithm.

Aggregating Local Graphs into Global DAG

Once the local graphs for each demonstration have been generated, they need to be combined into a single DAG to be used directly in the LfD-STL framework. We develop an algorithm that aggregates all local graphs into a single DAG. The for loop first generates the local graphs and stores them in a dataset $\mathcal{G}$ (lines 2-5). For every directed edge between any pairs of vertices u and v, the mean of the weights on corresponding edges across all graphs in $\mathcal{G}$ is computed (line 6 algorithm 2). For example, consider the local graphs of 2 sample demonstrations shown FIGS. 26A-26D. By averaging the edge weights of the graphs of the 2 demonstrations, we get the intermediate weighted and directed graph shown in FIG. 26C, which is not necessarily acyclic since there is a cycle between nodes representing $\varphi_1$ and $\varphi_2$. In the figure with 2 sample demonstrations whose edge weights are represented as $w_{ij}^1$ and $w_{ij}^2$ respectively, each $w'_{ij} = (w_{ij}^1 + w_{ij}^2)/2$. This intermediate graph needs to be further reduced to a weighted DAG, i.e., by eliminating any cycles/loops. The global DAG also imposes a partial order of specifications. For any 2 specifications $\varphi_i$ and $\varphi_j$, $\varphi_i \succeq \varphi_j$ if $\varphi_i \geq \varphi_j$ on average which creates an edge between them according to algorithm 2. We define a partial ordering over demonstrations: for any 2 demonstrations $\xi_1$ and $\xi_2$, $$\xi_1 \prec \xi_2 \text{ if } \rho_{1i} \leq \rho_{2i}, \forall i \in \{1, \dots, n\}.$$

Thus we say that $\xi_2$ is better or at least as good as $\xi_1$.

Conversion/Reduction to Weighted DAG

Note that there can only be at most 2 edges between any pair of vertices since the outgoing (similarly, incoming) edges are averaged into a single edge. In order to reduce this graph to a global DAG, we systematically eliminate edges by first computing the difference between the outgoing and incoming edge and then checking if it is above a certain threshold to add an edge in the direction of positive difference (note that if the difference is negative, the edge can be simply reversed). In other words, for any 2 nodes, u and v, if $(w(u, v) - w(v, u)) > \epsilon$, then $e(u, v)$ is retained with new weight $w(u, v) - w(v, u)$, while $e(v, u)$ is removed or discarded since it gets absorbed by the retained edge. The threshold $\epsilon$ again acts as a high-pass filter. As we can observe in the case of bi-directional edges, one of the edges will be "consumed" by the other or both will be discarded if they are similar. Thus all cycles/loops are eliminated resulting in a weighted DAG and can be directly used to compute rewards for reinforcement learning tasks as shown in the LfD-STL framework. For a DAG, the weights associated with the nodes computed via Equation 1 are non-negative.

For any two demonstrations $\xi_1$ and $\xi_2$ in an environment, if $\xi_1 \preceq \xi_2$, then the cumulative rating/scores are such that $r_{\xi_2} < r_{\xi_1}$. The global graph explains the average performance of demonstrations and is intuitive for non-expert users to teach agents to do tasks as well as understand the policies the agent is learning.

Grid-World

For comparison purposes, we used the same discrete-world settings from the LfD-STL work of varying grid sizes and randomized obstacle locations. We also used the same STL specifications for this environment: (i) avoiding obstacles at all times, (ii) reaching the goal state eventually, and (iii) reaching the goal as quickly as possible.

As in the LfD-STL framework, the demonstrators interact with the environment using the PyGame library user interface to provide demonstrations. For the 5×5 grid, we collected 4 demonstrations from one of the authors of this paper and the graph learnt by our method along with the rewards inferred for 2 sample demonstrations are shown in FIGS. 27A-27D. The graph represents that the performance on $\varphi_2$ (reaching the goal) and $\varphi_3$ (taking the fewest steps possible) was more than $\varphi_1$ (being safe or far away from obstacles). We can observe that this is quite intuitive as the only path to the goal from the start must pass through the 2 cells in between the obstacles in the middle column and hence the demonstrations are always along the border of the obstacle regions causing the performance/robustness to be lower than that of the other 2 specifications. In the reward figures with blue heatmaps, darker colors represent higher rewards.

In the 7×7 grid shown in FIGS. 28a-28D, there is more room to navigate around the obstacles and so, the performance for the safety specification is improved as seen in the corresponding inferred DAG. The fact that there are no edges indicates that the demonstrations performed equally well, on average, on all the specifications. This again is intuitive from the 2 sample demonstrations shown because they both reach the goal, are reasonably safe and take the fewest possible steps in reaching the goal. We show 2 of the 6 demonstrations collected for this environment along with the rewards that correspond to the learnt DAG. Similar results were obtained for other larger grid sizes and stochastic dynamics considered in this experiment. Further details are described in the Appendix. In all cases, we were able to extract the same optimal policy for the robot as in the prior work, but without having the user or expert explicitly describe the DAG beforehand, which is a significant improvement.

2-D Driving Simulator

As another comparison environment, we used the PyGame-based 2-D driving simulator using the Dubins car model, along with the STL specifications described in. Briefly, the STL specifications correspond to (i) reaching the goal $\varphi_1$, (ii) avoiding the hindrance/obstacle regions $\varphi_2$, (iii) always staying within the workspace region $\varphi_3$, and (iv) reaching the goal as fast as possible $\varphi_4$. Additionally, the same 8 demonstrations used in the baseline were also used to infer the DAGs in this method. We used the method in the baseline LfD-STL for continuous spaces to learn the approximation of the reward function, for comparison purposes. The plots shown in FIGS. 29A-29D, describe (a) the inferred DAG from 8 demonstrations, (b) the driving layout/scenario showing the goal in open square and obstacle in filled square along with a sample demonstration/trajectory in green, (c) the rewards from baseline with pre-specified DAG from users and (d) the rewards using the DAG from PeGLearn. This resembles a real-world scenario wherein, one of the challenging problems in autonomous driving is overtaking moving or stationary (parked) vehicles on the road-sides (e.g., urban and residential driving). The scenario presented here is a high-level abstraction where the purple region could be a parked car and the yellow region is the goal state of the ego car after overtaking the parked car. The light-yellow shaded region could be the dimensions of the road/lane and the task for the ego car is to navigate around the parked car to the goal state without exiting the lane. From these figures, we can observe that the rewards using the inferred DAG are consistent with the specifications, i.e., the rewards are aligned with the driving layout and similar to, if not more-shaped than the explicitly-defined DAGs. Hence, both these experiments show that our method addresses one of the major concerns in prior works.

CARLA Driving Simulator

We evaluated our method on the CARLA driving simulator on a highway scenario (Town04 map). A demonstrator can control the car via an analog Logitech G29 steering with pedal controller or using keyboard inputs. The states of the car provided by the environment are: lateral distance and heading error between the ego vehicle to the target lane center line (in meter and rad), ego vehicle's speed (in meters per second), and (Boolean) indicator of whether there is a front vehicle within a safety margin. Based on this information, we formulated 3 STL specifications as follows:

Keeping Close to the Center of the Lane:

$\varphi_1 := G_{[0,T]}(d_{lane}[t] \leq \delta)$, where T is the length of a demonstration, $d_{lane}$ is the distance of car from the center of the lane at each step t and $\delta$ is a small tolerance factor. The width of a typical highway lane in the US is 12 ft (3.66 m) and the average width of a big vehicle (e.g., SUV or pickup truck) is 7 ft (2.13 m)³, which leaves about 2.5 ft (0.76 m) of room on either side of the vehicle. Hence we chose to use 1 ft (0.3 m) as the tolerance factor to accurately track the lane center while also providing a small room for error.

Maintaining Speed Limits:

$\varphi_2 := G_{[0,T]}(V_{min} \leq v[t] \leq V_{max})$, where v is speed of the ego/host car at each timestep, and Vmin and Vmax are the speed limits. Since it is a US highway scenario, the $V_{max}=65$ mph and $V_{min}=0$ mph.

Maintain safe distance from any lead vehicle:

$\varphi_3 := G_{[0,T]}(\text{safety\_flag} \leq 0)$, where safety_flag is a binary signal that outputs 0 if the ego is safe (i.e., there is no vehicle directly in front of the ego in the same lane whose distance is closer than some threshold $d_{safe}$) and 1 otherwise. In OpenAI Gym-CARLA, the safe distance was set to 15 m.

Figure 30:
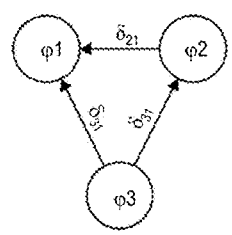
FIG. 30 shows an example DAG obtained from demonstrations in the CARLA simulator.
Figure 31A:
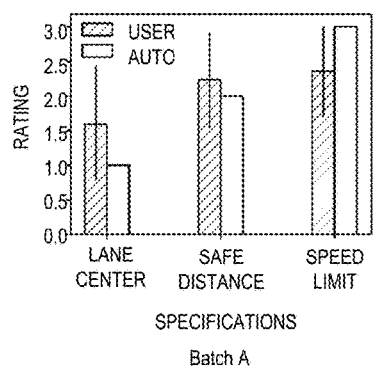
FIGS. 31A-31C show comparison of specification orderings between humans and PeGLearn.
Figure 31B:
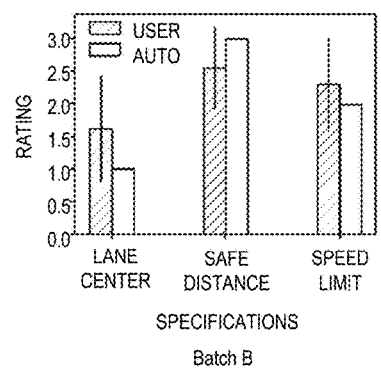
Figure 31C:
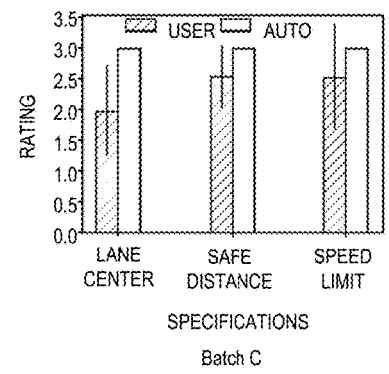
Figure 32A:
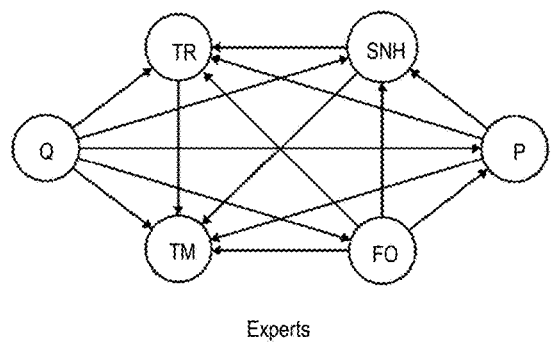
FIGS. 32A-32D show example DAGs for the Knot-Tying task. In particular.
Figure 32B:
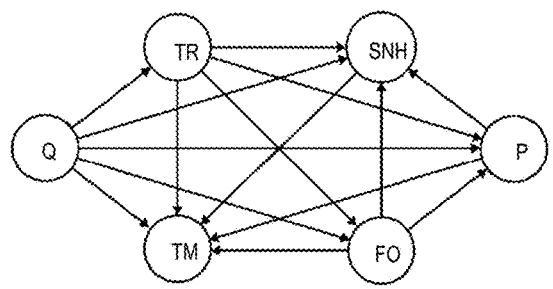
Figure 32C:
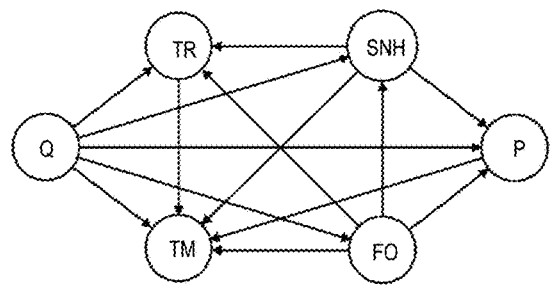
Figure 32D:
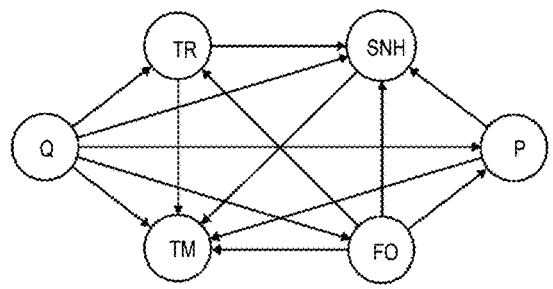

For this scenario, we collected 15 demonstrations from one of this work's authors via the analog controller and recorded the driving videos. The STL robustness was computed for each specification and the DAG inferred via PeGLearn is shown in FIG. 30. The graph explains (by topological ordering) that the demonstrators regarded maintaining safe distance ((3) as their prime priority over maintaining lane speed limits ((2) and keeping at the center of the lane ((1). Likewise, $\varphi_2$ was prioritized over $\varphi_1$.

User Study. The recorded driving videos were used to perform a user study to determine if users would rate the driving behavior in a similar way, thereby providing justification that the graphs generated using our method are indeed explainable. Using the Amazon Mechanical Turk (AMT) platform, we created a survey of 3 batches with each batch consisting of 5 of the 15 driving videos. All videos were exclusive to their respective batches, i.e., no video was used in more than 1 batch. Furthermore, the 5 videos in each batch exhibited a common/particular ordering of the specifications. Each participant of a batch was shown the corresponding 5 driving videos and we collected their response to the following queries:

Participant information: Number of years of driving experience, age, gender and experience with video games.

Ratings on a scale of 1 (worst)-5 (best) for the queries/specifications: (i) driver staying close to the lane center, (ii) driver maintaining safe distance to lead vehicle(s) and (iii) driver respecting speed limits of the highway.

Ratings on a scale of 1 (lowest)-3 (highest) on the overall driving behavior shown in these 5 videos and also how the participants would prioritize each of the specifications if they were driving in that scenario.

We recruited 150 human participants via AMT service and took numerous measures to ensure reliability of results. We posed a control question at the end to test their attention to the task, and eliminated data associated with the wrong answer, including incomplete data, resulting in 146 samples. All participants had an approval rating over 98% and the demographics are as follows: (i) 73 males, 72 females, 1 other, split uniformly across batches, (ii) participant age ranged from 22 to 79 with an average age of 40.67, and (iii) average driving experience of 22.4 years. Each video was 30 seconds long on average and the driving behaviors consisted of driving almost perfectly, swaying around the lane center or exiting the lane and crashing into another vehicle.

Analysis. We obtain the ratings and hence specification-orderings from both, participants and our algorithm, for each video. The total number of possible orderings for the 3 specifications is 27(=$3^3$), so for each video and participant, we also generate an ordering randomly and uniformly chosen from the space of 27 orderings. As another baseline, we employed unsupervised learning combined with supervised learning to obtain orderings based on the individual specification ratings. Specifically, we clustered the individual ratings using Gaussian Mixture Models (GMMs) and used the Bayesian information criterion to determine the best fit and optimal number of components (either 1 or 2 since there are at most 2 types of demonstrations-good and bad). If there was only 1 component, we used mean of GMM as the cumulative ratings. If there were 2 components, we used SVM to classify the means of the 2 components and hence obtained the weights (SVM coefficients) as the cumulative ratings. Finally, these cumulative ratings were ranked accordingly to obtain the orderings. We refer to this method as GMM+SVM.

We then compute the Hamming distance between the human expert orderings and orderings from (i) PeGLearn, (ii) GMM+SVM, and (iii) uniform random. The reason being that the Hamming distance h(a, b) between any 2 sequences, a and b, of equal lengths measures the number of element-wise disagreements or mismatches, and hence gives an estimate of how close any 2 orderings are. The Hamming distance h has a value in the range [0, 1] with 0 representing same elements in both sequences at corresponding positions and 1 indicating completely different elements at each corresponding position. The goal of this hypothesis is to show that (i) human expert and PeGLearn orderings are similar and they are not random coincidence, and (ii) the PeGLearn orderings are closer to human experts than those of GMM+SVM. This further implies that the orderings (and hence the global DAG) generated by our method are similar to those of human-perceived ratings, thereby providing evidence for explainability of demonstrations. For additional information about this survey, we refer the reader to the Appendix. To perform statistical analysis, we introduce a few notations, for convenience, as follows: (i) DH represents the PeGLearn-human Hamming distance or error, (ii) CH represents the GMM+SVM-human Hamming error, and (iii) RH represents the random-human Hamming error. We concatenate these errors under the name "Score" for statistical analysis purposes.

A two-way ANOVA was conducted to examine the effects of agent type and batch number on the "Score". Residual analysis was performed to test for the assumptions of the two-way ANOVA. There was a statistically significant interaction between agent type and batch number for "Score", $F(4, 429)=9.657$, $p<0.001$, partial $\eta^2=0.083$. Therefore, an analysis of simple main effects for agent type was performed with statistical significance receiving a Bonferroni adjustment and being accepted at the $p<0.025$ level. The batch number did not have a statistically significant effect on mean "Score" for DH, $F(2, 429)=0.679$, $p=0.508$, partial $\eta^2=0.003$. There was a statistically significant difference in mean "Score" for CH among the 3 batches, $F(2, 429)=26.329$, $p<0.001$, partial $\eta^2=0.109$. The batch number did not have a statistically significant effect on mean "Score" for RH, $F(2, 429)=0.465$, $p=0.628$, partial $\eta^2=0.002$.

All pairwise comparisons were run for each simple main effect with reported 95% confidence intervals and p-values Bonferroni-adjusted within each simple main effect. For Batch 1, there was a statistically significant difference in "Score" among the 3 agent types, $F(2,429)=18.787$, $p<0.001$, partial $\eta^2=0.081$. The mean "Score" was 0.510 (SD=0.216) for DH, 0.843 (SD=0.181) for CH and 0.674 (SD=0.259) for RH. Therefore, DH had the best performance on Batch 1 and was better than the other 2. For Batch 2, there was a statistically significant difference in "Score" among the 3 agent types, $F(2, 429)=14.983$, $p<0.001$, partial $\eta^2=0.065$. The mean "Score" was 0.465 (SD=0.281) for DH, 0.458 (SD=0.272) for CH and 0.722 (SD=0.269) for RH. Therefore, DH and CH had similar performance on Batch 2 and both performed better than RH. For Batch 3, there was a statistically significant difference in "Score" among the 3 agent types, $F(2, 429)=15.564$, $p=0.022$, partial $\eta^2=0.068$. The mean "Score" was 0.449 (SD=0.337) for DH, 0.735 (SD=0.304) for CH and 0.680 (SD=0.272) for RH. Therefore, DH had lowest mean "Score" for Batch 3 and performed better than the other 2. Further details about pairwise comparisons are provided in the Appendix.

Note that lower the Hamming distance or "Score", the more similar are the 2 sequences. We can see from the analysis that the batch number did not have a significant interaction with the outcomes of our algorithm, whereas it affected the results of the clustering-based algorithm on Batch 2. The analysis shows that in all the batches, PeGLearn had significantly different means in Hamming error or "Score" compared to the random ordering, showing support for H1. In terms of overall similarity, we also see that the human expert orderings are closer to ours than the clustering-based orderings. In terms of performance, in 2 batches (Batch 1 and Batch 3), our algorithm outperformed the clustering method and on Batch 2, it had similar/comparable performance with clustering since the difference was not statistically significant. Thus, this analysis provides support for H2, that our algorithm does not perform worse than clustering algorithms, while also being computationally more efficient.

Comparison with GMM+SVM. GMMs typically have a complexity of $\mathcal{O}(mkn^3)$ where m is the number of data points (i.e., demonstrations), k is the number of components and n is the dimension of data (i.e., number of specifications). Linear SVM follows linear complexity in m and so the combination of GMM+SVM is still $\mathcal{O}(mkn^3)$. Since there are at most k=2 components in our formulation, the k can be treated as a constant and the complexity reduces to $\mathcal{O}(mn^3)$. Our algorithm on the other hand has a complexity of $\mathcal{O}(mn^2)$ when using matrices to represent graphs. This shows that our algorithm not only performs as good as state-of-the-art methods, but is also more efficient. In terms of theoretical guarantees to partial ordering of demonstrations, Theorem III.1 cannot be guaranteed to hold when using GMM+SVM because the weights obtained from SVM could be negative, violating Lemma III.1. All the experiments and results show that our method can not only learn accurate rewards similar to the way humans perceive them, but it does so with a limited number of even imperfect data. We also perform experiments on a robotic surgical dataset (JIGSAWS) to demonstrate how human Likert ratings can be used to learn DAGs (refer Appendix). Additionally, together with the LfD-STL framework, we are able to learn temporal-based rewards, even in continuous and high-dimensional spaces with just a handful of demonstrations.

Provided herein is a novel methodology to capture the performance of demonstrator behaviors in terms of graphs to provide intuitive representations about the demonstrations shown to the robot. We showed that the inferred graphs could be directly applied to the existing LfD-STL framework to extract rewards and control policies via RL. Additionally, to show that the graphs are indeed explainable, we conducted a user study and provided evidence via statistical analysis that the human-based ratings were similar to method provided herein, which also performed better than clustering algorithms. The PeGLearn algorithm was able to infer DAGs with a limited number of even imperfect demonstrations. Using intuitive structures such as DAGs to represent rewards and trajectories would provide insights into the learning aspects of RL agents, as to the quality of behaviors they are learning.

It should initially be understood that the disclosure herein may be implemented with any type of hardware and/or software, and may be a pre-programmed general purpose computing device. For example, the system may be implemented using a server, a personal computer, a portable computer, a thin client, or any suitable device or devices. The disclosure and/or components thereof may be a single device at a single location, or multiple devices at a single, or multiple, locations that are connected together using any appropriate communication protocols over any communication medium such as electric cable, fiber optic cable, or in a wireless manner.

It should also be noted that the disclosure is illustrated and discussed herein as having a plurality of modules which perform particular functions. It should be understood that these modules are merely schematically illustrated based on their function for clarity purposes only, and do not necessary represent specific hardware or software. In this regard, these modules may be hardware and/or software implemented to substantially perform the particular functions discussed. Moreover, the modules may be combined together within the disclosure, or divided into additional modules based on the particular function desired. Thus, the disclosure should not be construed to limit the present invention, but merely be understood to illustrate one example implementation thereof.

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a "data processing apparatus" on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The various methods and techniques described above provide a number of ways to carry out the invention. Of course, it is to be understood that not necessarily all objectives or advantages described can be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as taught or suggested herein. A variety of alternatives are mentioned herein. It is to be understood that some embodiments specifically include one, another, or several features, while others specifically exclude one, another, or several features, while still others mitigate a particular feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be employed in various combinations by one of ordinary skill in this art to perform methods in accordance with the principles described herein. Among the various elements, features, and steps some will be specifically included and others specifically excluded in diverse embodiments.

Although the application has been disclosed in the context of certain embodiments and examples, it will be understood by those skilled in the art that the embodiments of the application extend beyond the specifically disclosed embodiments to other alternative embodiments and/or uses and modifications and equivalents thereof.

In some embodiments, the terms "a" and "an" and "the" and similar references used in the context of describing a particular embodiment of the application (especially in the context of certain of the following claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. No language in the specification should be construed as indicating any non-claimed element essential to the practice of the application.

Certain embodiments of this application are described herein. Variations on those embodiments will become apparent to those of ordinary skill in the art upon reading the foregoing description. It is contemplated that skilled artisans can employ such variations as appropriate, and the application can be practiced otherwise than specifically described herein. Accordingly, many embodiments of this application include all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

Particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

All patents, patent applications, publications of patent applications, and other material, such as articles, books, specifications, publications, documents, things, and/or the like, referenced herein are hereby incorporated herein by this reference in their entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that can be employed can be within the scope of the application. Thus, by way of example, but not of limitation, alternative configurations of the embodiments of the application can be utilized in accordance with the teachings herein. Accordingly, embodiments of the present application are not limited to that precisely as shown and described.

The invention claimed is:

1. A system for reinforcement learning, the system comprising:
    one or more processors;
    a computer-readable medium storing executable instructions that, when executed, cause the system to perform operations comprising:
        receive a set of demonstrations, the set of demonstrations obtained via interaction of an agent with an environment determined according to sensor input from one or more sensors of the agent;

receive a set of specifications, the set of specifications providing descriptions of one or more tasks and/or one or more objectives;

convert the set of specifications into a signal temporal logic formal language in real-time;

evaluate the set of demonstrations based on the set of specifications in the signal temporal logic formal language;

generate a robustness value for each demonstration in the set of demonstrations based on the evaluation;

infer rewards for each demonstration based on the robustness value;

learn a control policy based on the inferred rewards; and provide one or more control signals to one or more actuators of the agent based on the control policy.

2. The system of claim 1, wherein the computer-readable medium stores further instructions that when executed cause the system to:

verify the learned control policy based on the set of specifications to determine a final policy.

3. The system of claim 1, wherein the computer-readable medium stores further instructions that when executed cause the system to:

for each demonstration comprising a set of state and action pairs, generate a state reward corresponding to each state; and generate a candidate reward for each demonstration based on the state reward for each state in the set of states for each demonstration.

4. The system of claim 3, wherein inferring rewards for each demonstration comprises ranking each demonstration based on the robustness value, and determining a learner reward for the agent based on the ranks and corresponding candidate rewards for each demonstration.

5. The system of claim 1, wherein the control policy is determined based on a reinforcement learning algorithm.

6. The system of claim 1, wherein the set of specifications are provided in natural language.

7. The system of claim 1, wherein the agent is selected from the group consisting of a cyber-physical system, a robotic system, an autonomous vehicle, an insulin delivery system, and a drone.

8. The system of claim 1, wherein each specification in the set of specifications is represented as a directed acyclic graph (DAG).

9. A system, comprising:

one or more sensors configured to acquire environmental data of an environment interacting with the system;

one or more processors;

a computer-readable medium storing executable instructions that, when executed, cause the system to perform operations comprising:

evaluate a current state of the system according to the environmental data from the one or more sensors; and determine an action to be performed by the system based on the current state according to a control policy;

wherein the control policy is learned based on inferred rewards from a plurality of demonstrations; and wherein the plurality of demonstrations are evaluated and ranked based on a robustness value of each demonstration using a set of specifications in a formal language; and provide control signals to one or more actuators based on the control policy.

10. The system of claim 9, wherein the formal language is selected from the group consisting of is selected from the group consisting of a temporal logic, a Signal Temporal Logic (STL), a Linear Temporal Logic (LTL), and a Computation Tree Logic (CTL).

11. The system of claim 9, wherein the inferred rewards are based on uncertainties in the environment; and wherein the inferred reward increases with increase in uncertainty.

12. A method for performing reinforcement learning, the method comprising:

receiving a set of demonstrations, the set of demonstrations obtained via interaction of an agent with an environment;

receiving a set of specifications, the set of specifications providing descriptions of one or more tasks and/or one or more objectives;

converting the set of specifications into a temporal logic formal language;

evaluating the set of demonstrations based on the set of specifications in the temporal logic formal language;

generating a robustness value for each demonstration in the set of demonstrations based on the evaluation;

inferring rewards for each demonstration based on the robustness value;

learning a control policy based on the inferred rewards; and storing the control policy; and provide one or more control signals to one or more actuators of the agent based on the control policy.

13. The method of claim 12, wherein the temporal logic is selected from the group consisting of Signal Temporal Logic (STL), Linear Temporal Logic (LTL), and Computation Tree Logic (CTL).

14. The method of claim 12, further comprising, for each demonstration comprising a set of state and action pairs, generating a state reward corresponding to each state.

15. The method of claim 14, further comprising, generating a candidate reward for each demonstration based on the state reward for each state in the set of states.

16. The method of claim 15, wherein inferring rewards for each demonstration comprises ranking each demonstration based on the robustness value, and determining a learner reward for the agent based on the ranks and corresponding candidate rewards for each demonstration.

17. The method of claim 15, wherein the agent is selected from the group consisting of a cyber-physical system, a robotic system, an autonomous vehicle, an insulin delivery system, and a drone.

* * * * *